(12) United States Patent
Yoshiya

(10) Patent No.: US 10,578,420 B2
(45) Date of Patent: Mar. 3, 2020

(54) DEVICE FOR ROTATION ANGLE DETECTION

(71) Applicant: MELEXIS TECHNOLOGIES SA, Bevaix (CH)

(72) Inventor: Takumi Yoshiya, Tokyo (JP)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 16/017,215

(22) Filed: Jun. 25, 2018

(65) Prior Publication Data

US 2018/0372475 A1    Dec. 27, 2018

(30) Foreign Application Priority Data

Jun. 26, 2017   (JP) ................ 2017-123982

(51) Int. Cl.
    *G01B 7/305*      (2006.01)
    *G01D 5/14*      (2006.01)
    (Continued)

(52) U.S. Cl.
    CPC ............... *G01B 7/305* (2013.01); *G01B 7/30* (2013.01); *G01D 5/145* (2013.01); *G01B 7/28* (2013.01)

(58) Field of Classification Search
CPC .......... G01B 7/28; G01B 7/305; G01D 5/145; G01D 5/244; G01R 33/093
USPC ........ 324/200, 207.2–207.25, 226, 631, 166, 324/160, 600, 167, 76.11, 86, 381, 463, 324/213, 207.13, 234, 239, 500, 529, 530, 324/177; 374/45, 178, 170, 163; 341/116
See application file for complete search history.

(56) References Cited

U.S. PATENT DOCUMENTS 6,545,462 B2    4/2003   Schott et al.
9,671,214 B2    6/2017   Ausserlechner
(Continued)

FOREIGN PATENT DOCUMENTS

DE    102014110019 A1    6/2015
DE    102016120242 A1    5/2017
(Continued)

OTHER PUBLICATIONS

German Search Report from DE Application No. 102018115103.9, dated Jan. 22, 2019.

(Continued)

*Primary Examiner* — Melissa J Koval
*Assistant Examiner* — Trung Nguyen
(74) *Attorney, Agent, or Firm* — Workman Nydegger

(57) ABSTRACT

A rotation angle detection system comprises a magnet arranged to rotate around a rotation axis. A first magnetic detection circuit defines a first surface provided with a first and second pairs of magnetic detection elements. A signal processing unit is configured to output a signal representative of a rotation angle of the magnet based on outputs of the first and second pair of magnetic detection elements. A second magnetic detection circuit is provided with another first and second pairs of magnetic detection elements. The signal processing unit is configured to output a redundant signal corresponding to a rotation angle of the magnet based on outputs of the other first pair of magnetic detection elements and the other second pair of magnetic detection elements.

15 Claims, 15 Drawing Sheets

(51) Int. Cl.
*G01B 7/30* (2006.01)
*G01B 7/28* (2006.01)

(56) References Cited

U.S. PATENT DOCUMENTS

| | | | |
|---|---|---|---|
| 9,851,221 | B2 | 12/2017 | Lang et al. |
| 10,048,328 | B2 | 8/2018 | Hegedus et al. |
| 10,302,461 | B2 | 5/2019 | Yoshiya |
| 2002/0021124 | A1 | 2/2002 | Schott et al. |
| 2011/0025311 | A1 | 2/2011 | Chauvin et al. |
| 2013/0241538 | A1* | 9/2013 | Akabane .......... G01B 7/30 324/207.25 |
| 2015/0008907 | A1 | 1/2015 | Janisch |
| 2015/0022192 | A1 | 1/2015 | Ausserlechner |
| 2016/0041007 | A1 | 2/2016 | Lang et al. |
| 2016/0113604 | A1* | 4/2016 | Noshi ............... A61B 6/037 600/431 |
| 2016/0334242 | A1 | 11/2016 | Ausserlechner |
| 2017/0131367 | A1 | 5/2017 | Hegedus et al. |
| 2018/0031392 | A1 | 2/2018 | Yoshiya |
| 2018/0274944 | A1 | 9/2018 | Yoshiya |

FOREIGN PATENT DOCUMENTS

| | | |
|---|---|---|
| EP | 1182461 A2 | 2/2002 |
| EP | 1498697 A1 | 1/2005 |
| EP | 2888558 A1 | 7/2015 |
| JP | 2007010449 A | 1/2007 |
| JP | 2010107440 A | 5/2010 |
| JP | 2016514833 A | 5/2016 |
| JP | 2016102659 A | 6/2016 |
| JP | 2016156682 A | 9/2016 |
| JP | 2017067480 A | 4/2017 |
| JP | 2017067695 A | 4/2017 |
| WO | 2005054784 A1 | 6/2005 |

OTHER PUBLICATIONS

"3D Magnetic Sensor Low Power 3D Magnetic Sensor with I2C Interface TLV493D-A1B6 3D Magnetic Sensor," Infineon, Jan. 29, 2016, 23 Pages.

"Under-the-Hood" Triaxis Rotary Position feat. SENT Protocol, Melexis, May 17, 2017, 41 Pages.

Office Action from corresponding Japanese Application No. 2017-123982, dated Oct. 25, 2018, 9 Pages.

Office Action from corresponding Japanese Application No. 2017-123982, dated Feb. 6, 2019, 7 Pages.

* cited by examiner

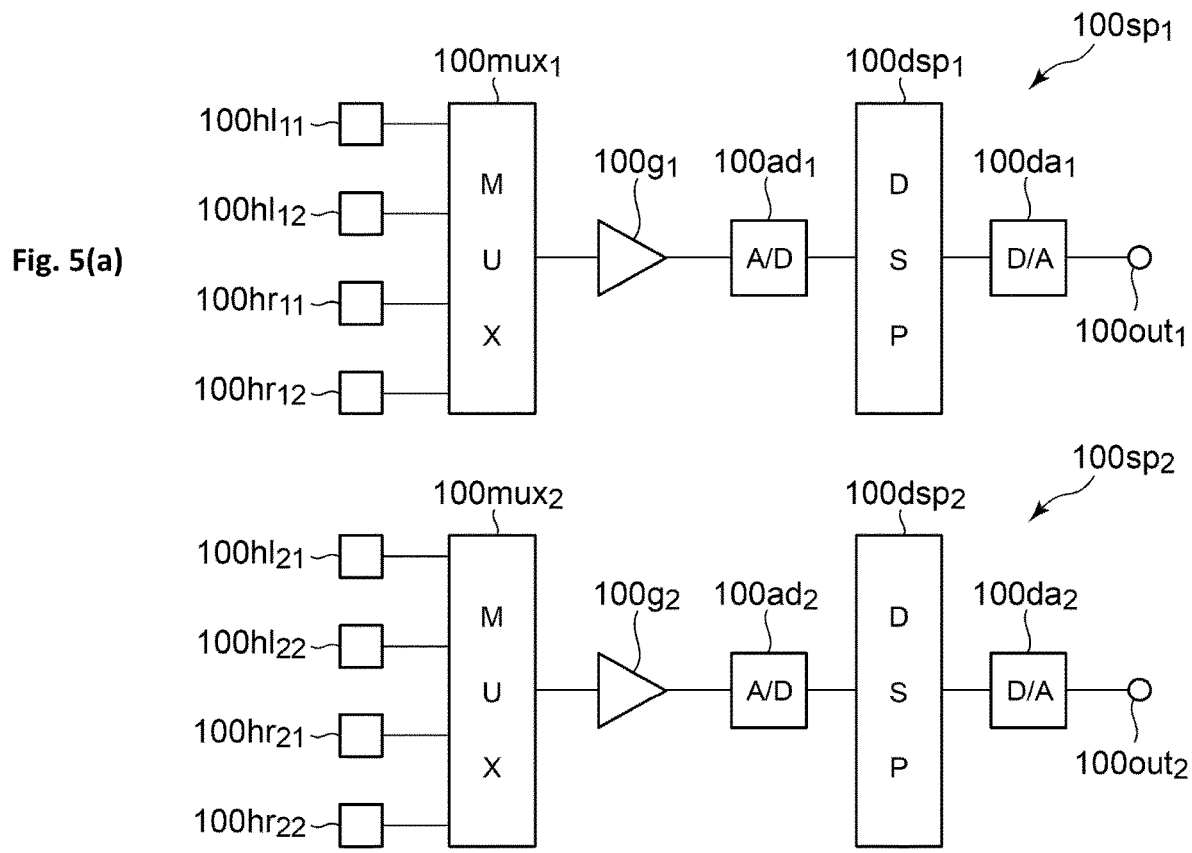
Fig. 5(a)
Fig. 5(b)
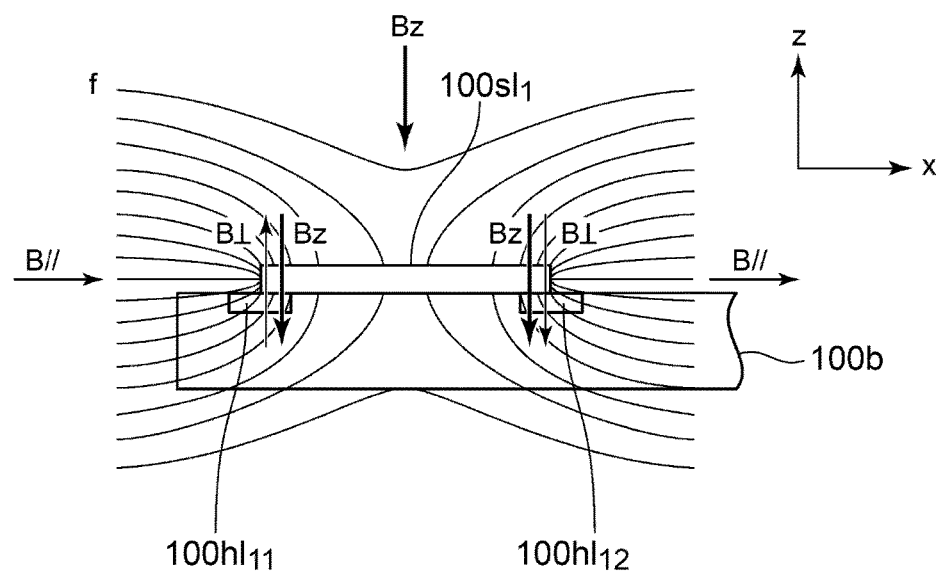
Fig. 6

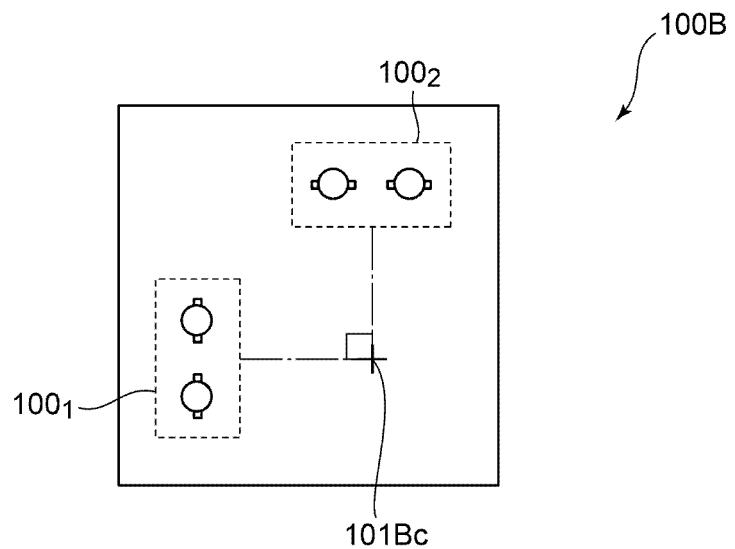
Fig. 12
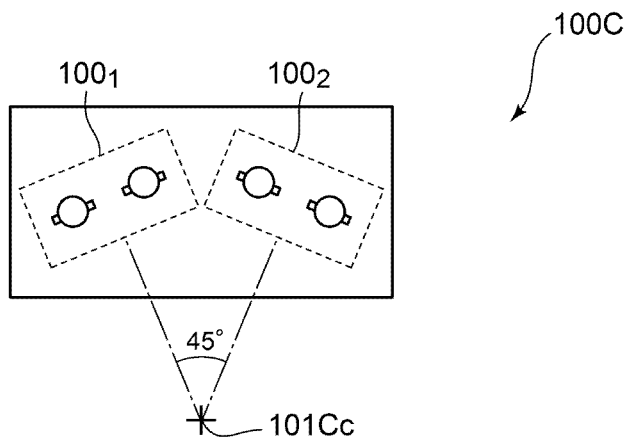
Fig. 13
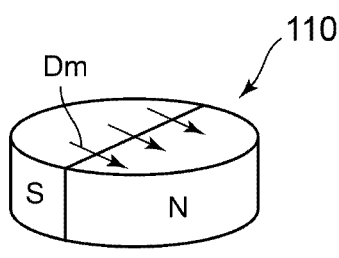 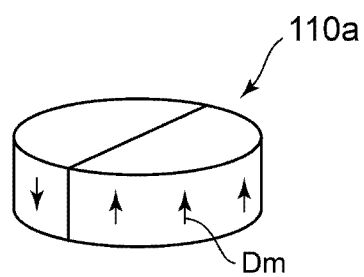
Fig. 14(a)          Fig. 14(b)

DEVICE FOR ROTATION ANGLE DETECTION

FIELD OF THE INVENTION

The present invention is generally related to the field of rotation angle detectors, attitude control devices, automatic steering devices and throttle devices.

BACKGROUND OF THE INVENTION

As a conventional technology, a rotation angle detector for detecting a direction of a rotating magnetic field has been proposed (e.g., see JP 2007-10449 A).

A rotation angle detector disclosed in JP 2007-10449 A or JP 2016-514833 A has a sensor disposed with a pair of magnetic detection elements in a plurality of directions with respect to a rotating magnetic field, and a signal processing part that processes a signal output from each magnetic detection element of the sensor and outputs a signal corresponding to an angle of the magnetic field. In the rotation angle detector the signal processing part specifies an influence of magnetic noise by comparing a phase and an amplitude of each output of the pair of magnetic detection elements when the magnetic field is rotated, and outputs a signal with reduced influence of magnetic noise by subtracting the influence of the magnetic noise, or by performing calculation processing such as averaging individual outputs of the pair of magnetic detection elements.

In the rotation angle detector of JP 2007-10449 A or JP 2016-514833, however, although the magnetic noise influence is reduced and the rotating magnetic field direction is detected, a rotational centre of the rotating magnetic field needs to substantially coincide with a centre of the rotation angle detector. Therefore, in case a plurality of rotation angle detectors is disposed (for example, a pair of rotation angle detectors for preventing a malfunction or for backup at a time of failure) and a centre of one rotation angle detector is made to coincide with the centre of the rotating magnetic field, a centre of another rotation angle detector does not coincide. Further, if the middle of the centres of both the rotation angle detectors is made to be the rotating magnetic field centre, no centre of the rotation angle detectors coincides. As a result, the problem occurs that the magnetic field detected by the rotation angle detector does not provide ideal change of magnetic field in design and that rotation cannot be detected. Further it may be necessary to correct a relationship between at least the magnetic field to be detected and an output signal. Moreover, for one rotation angle detector the magnetic detection element needs to be arranged in a plurality of directions with respect to the rotating magnetic field, causing the problem that the sensor shape cannot be made smaller than at least a region where the magnetic detection elements are disposed.

Hence, there is a need for a rotation angle detector wherein at least one of these drawbacks is avoided or overcome.

SUMMARY OF THE INVENTION

It is an object of embodiments of the present invention to provide for a rotation angle detector, an attitude control device, an automatic steering device and a throttle device, that are made smaller than conventional ones and able to detect a rotation angle even in a multiple arrangement.

The above objective is accomplished by the solution according to the present invention.

In a first aspect the invention relates to a rotation angle detector according to the invention includes:
a magnet arranged to rotate and
a first magnetic detection IC provided with a first pair of magnetic detection elements that have a normal line of a detection surface in parallel with a rotation axis direction of the magnet, are arranged in a region overlapping with the magnet, other than on a rotation axis in a plan view in which the rotation axis direction is a normal direction, and are configured to detect magnetic flux of the magnet, a second pair of magnetic detection elements arranged with a predetermined interval from the first pair of magnetic detection elements in a circumferential direction of rotation, and a signal processing unit configured to output a signal corresponding to a rotation angle of the magnet based on outputs of the first pair of magnetic detection elements and the second pair of magnetic detection elements,
a second magnetic detection IC having a same configuration as the first magnetic detection IC and on a same plane as the first magnetic detection IC, and arranged at a same distance as the first magnetic detection IC from the rotation axis of the magnet.

In a preferred embodiment of the rotation angle detector the signal processing unit determines a first magnetic flux density difference in the rotation axis direction and a second magnetic flux density difference in the circumferential direction of the rotation, from outputs of the first pair of magnetic detection elements and the second pair of magnetic detection elements, and outputs a signal corresponding to the rotation angle of the magnet based on the first magnetic flux density difference and the second magnetic flux density difference.

In the rotation angle detector the signal processing unit preferably determines a maximum value of an amplitude of the first magnetic flux density difference and a maximum value of an amplitude of the second magnetic flux density difference based on a rate of change in the amplitudes of the first magnetic flux density difference and the second magnetic flux density difference, and normalizes the amplitude of the first magnetic flux density difference and the amplitude of the second magnetic flux density difference in accordance with the maximum value of the amplitude of the first magnetic flux density difference and the maximum value of the amplitude of the second magnetic flux density difference. This allows normalizing the amplitude of the first magnetic flux density difference and the amplitude of the second magnetic flux density difference.

The invention also relates to a rotation angle detector including:
a magnet that rotates;
a first magnetic detection IC provided with a first two pairs of magnetic detection elements that have a normal line of a detection surface in parallel with a rotation axis direction of the magnet, are arranged in a region overlapping with the magnet, other than on a rotation axis in a plan view in which the rotation axis direction is a normal direction, and are configured to detect magnetic flux of the magnet, a second two pairs of magnetic detection elements arranged with a predetermined interval from the first two pair of magnetic detection elements in a circumferential direction of rotation, and a signal processing unit configured to output a signal corresponding to a rotation angle of the magnet based on outputs of the first two pairs of magnetic detection elements and the second two pairs of magnetic detection elements; and a second magnetic detection IC that has a same configuration as that of the first magnetic detection IC, is on a same plane as the first magnetic detection IC, and is arranged at a same distance as the first magnetic detection IC from the rotation axis of the magnet.

In embodiments of the rotation angle detector the signal processing unit determines a third magnetic flux density difference in a radial direction of the rotation and a second magnetic flux density difference in the circumferential direction of the rotation, from outputs of the first two pairs of magnetic detection elements and the second two pairs of magnetic detection elements, and outputs a signal corresponding to the rotation angle of the magnet based on the third magnetic flux density difference and the second magnetic flux density difference.

In further embodiments the signal processing unit determines a maximum value of an amplitude of the third magnetic flux density difference and a maximum value of an amplitude of the second magnetic flux density difference based on a rate of change in the amplitudes of the third magnetic flux density difference and the second magnetic flux density difference, and normalizes the amplitude of the third magnetic flux density difference and the amplitude of the second magnetic flux density difference in accordance with the maximum value of the amplitude of the third magnetic flux density difference and the maximum value of the amplitude of the second magnetic flux density difference.

In preferred embodiments the magnet has a magnetization direction in a direction orthogonal to the rotation axis.

In other preferred embodiments the magnet is divided into two parts by a plane passing through the rotation axis and the two parts are parallel to the rotation axis direction and magnetized in mutually opposite directions.

Advantageously the magnet is divided into a plurality of parts by a plane passing through the rotation axis according to a rotation angle to be detected, and the plurality of parts are parallel to the rotation axis direction and magnetized in mutually opposite directions.

In certain embodiments the magnet is formed only at a partial angle around a central axis.

In another aspect the invention also relates to a rotation angle detector including:

a magnet that rotates;

a first magnetic detection IC provided with a first pair of magnetic detection elements that have a normal line of a detection surface in parallel with a rotation axis direction of the magnet, are arranged in a region not overlapping with the magnet in a plan view in which the rotation axis direction is a normal direction, and are configured to detect magnetic flux of the magnet, a second pair of magnetic detection elements arranged with a predetermined interval from the first pair of magnetic detection elements in a circumferential direction of rotation, and a signal processing unit configured to output a signal corresponding to a rotation angle of the magnet based on outputs of the first pair of magnetic detection elements and the second pair of magnetic detection elements; and a second magnetic detection IC that has a same configuration as that of the first magnetic detection IC, is on a same plane as the first magnetic detection IC, and is arranged at a same distance as the first magnetic detection IC from the rotation axis of the magnet.

In yet a further aspect the invention relates to a rotation angle detector including:

a magnet that rotates;

a first magnetic detection IC provided with a first pair of magnetic detection elements that have a normal line of a detection surface in a circumferential direction with respect to a rotation axis of the magnet, are arranged in a region not overlapping with the magnet in a plan view in which a rotation axis direction is a normal direction, are arranged in a region overlapping with the magnet in a plan view in which a direction orthogonal to the rotation axis is a normal line, and are configured to detect magnetic flux of the magnet, a second pair of magnetic detection elements arranged with a predetermined interval from the first pair of magnetic detection elements in a circumferential direction of rotation, and a signal processing unit configured to output a signal corresponding to a rotation angle of the magnet based on outputs of the first pair of magnetic detection elements and the second pair of magnetic detection elements; and a second magnetic detection IC that has a same configuration as that of the first magnetic detection IC, and is arranged at a same distance as the first magnetic detection IC from the rotation axis of the magnet.

The invention also relates to an attitude control device including the rotation angle detector as previously described.

The invention also relates to an automatic steering device including the rotation angle detector as previously described.

The invention also relates to a throttle device including the rotation angle detector as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIGS. 5(a) to 5(b) illustrate a block diagram showing a configuration of a signal processing part of the Hall IC.

FIG. 6 illustrates a schematic cross-sectional view to explain a magnetic-flux detection operation of the Hall IC.

FIGS. 7(a1) to 7(a5) are front views and FIGS. 7(b1) to 7(b5) are plan views.

FIG. 12 illustrates a plan view showing a modified example of a configuration of the Hall IC.

FIG. 13 illustrates a plan view showing a modified example of a configuration of the Hall IC.

FIGS. 14(a) and 14(b) illustrate perspective views showing a modified example of a magnetization direction of the magnet.

DETAILED DESCRIPTION OF ILLUSTRATIVE EMBODIMENTS

Figure 1:
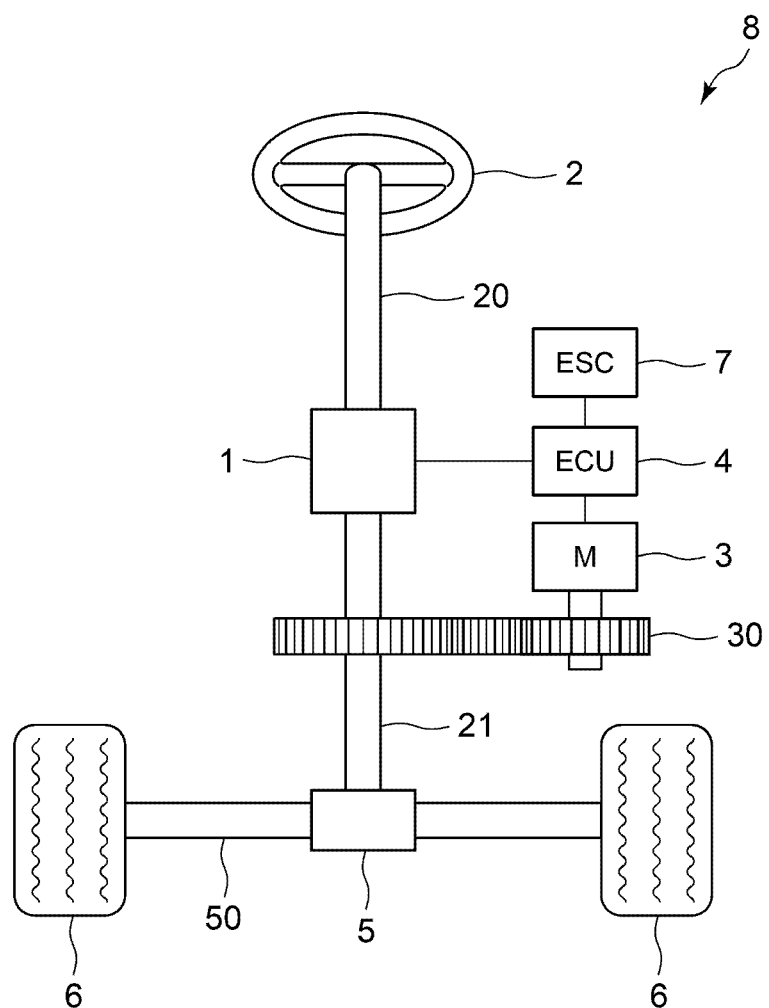
FIG. 1 illustrates a schematic view showing a configuration example of a steering system according to a first embodiment of this invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

FIG. 1 represents a schematic view of a configuration example of a steering system according to a first embodiment. A steering system 8 comprises a rotation angle detector 1 configured to detect a steering angle of a steering shaft 20 and output a detection signal, a steering wheel 2 connected to one end of the steering shaft 20, a motor 3 configured to rotate a column shaft 21 via a speed reduction gear 30 for automating steering of the steering wheel 2, an electric control unit (ECU) 4 configured to control an operation of the motor 3 in accordance with an output of the rotation angle detector 1 and/or to output information on the steering angle to an electronic stability control (ESC) 7, a pinion gear 5 configured to convert rotational motion of the column shaft 21 into linear motion of a rack shaft 50, a wheel 6 connected to the rack shaft 50 via a tie rod (not shown) or the like and the ESC 7 configured to stabilize an attitude at a time of turning of a vehicle, to prevent sideslip.

In the above configuration, rotation of the steering wheel 2 by a driver causes rotation of the steering shaft 20 connected to the steering wheel 2. The rotation of the steering shaft 20 causes an accompanying rotation of the column shaft 21. The rotation of the column shaft 21 causes a displacement of the rack shaft 50 via the pinion gear 5, changes an angle of a pair of wheels 6 in accordance with the displacement amount of the rack shaft 50.

The rotation angle detector 1 detects the steering angle of the steering shaft 20 and outputs a detection signal representative of the detected steering angle. When the detection signal is input from the rotation angle detector 1, the ECU 4 calculates the steering angle of the steering shaft 20 in accordance with the detection signal, and outputs information on the steering angle to the ESC 7. The ESC 7 stabilizes an attitude of a vehicle at a time of turning by controlling a brake and an engine output in accordance with the information on the input steering angle.

Further, in automating the steering of the vehicle the ECU 4 controls the motor 3 in accordance with the detection signal when the detection signal of the rotation angle detector 1 is input. The rotation of the motor 3 is decelerated by the speed reduction gear 30 to rotate the column shaft 21 to operate the steering wheel 2. It should be noted that an output of the motor 3 may be directly transmitted to the rack shaft 50 without passing through the column shaft 21.

Figure 2:
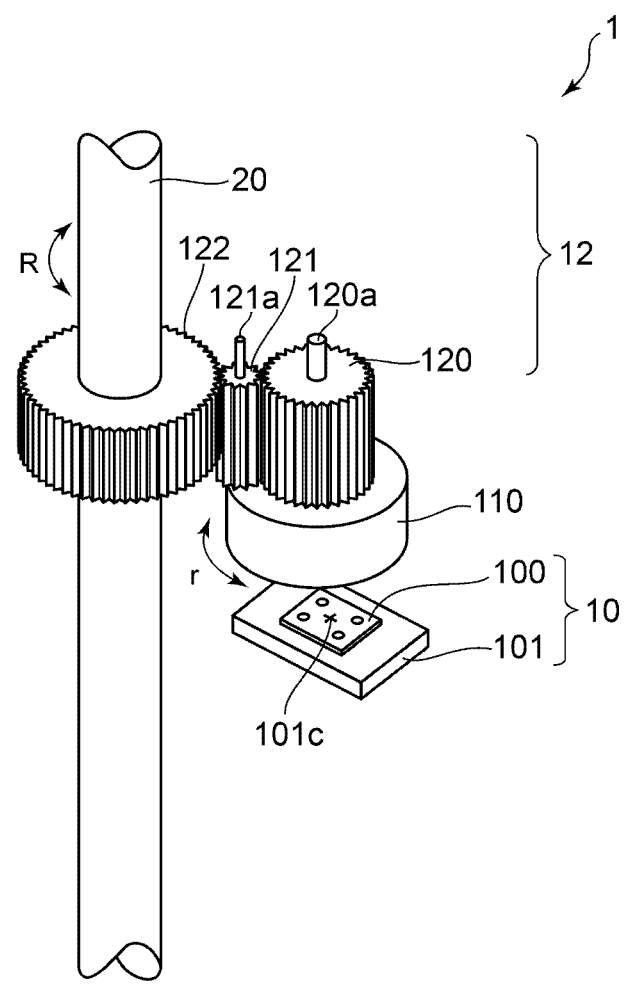
FIG. 2 is an exploded perspective view showing a configuration example of a rotation angle detector according to the first embodiment.
Figure 3A:
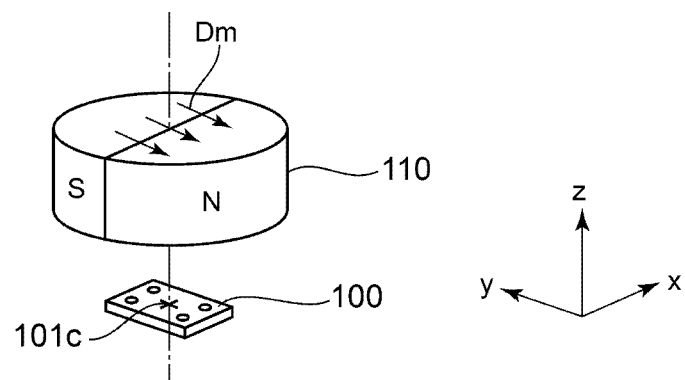
FIGS. 3(a) to 3(c) are a perspective view, a plan view and a front view explaining a positional relationship between a Hall IC and a magnet.
Figure 3B:
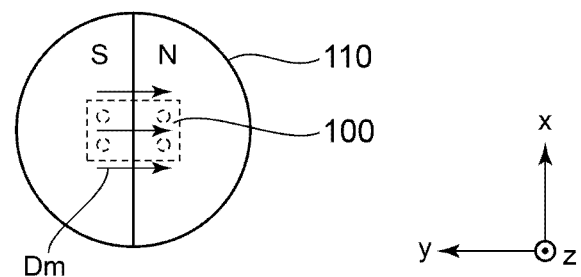
Figure 3C:
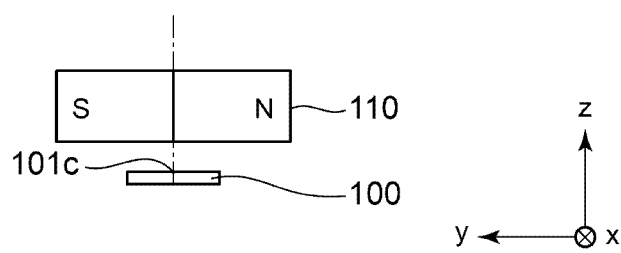

FIG. 2 is an exploded perspective view showing a configuration example of a rotation angle detector 1 according to the first embodiment. FIGS. 3(a) to 3(c) are a perspective view, a plan view and a front view for explaining a positional relationship between a Hall IC 100 and a magnet 110.

The rotation angle detector 1 has a magnetic detector 10 mounted with the Hall IC 100 on a substrate 101, a columnar magnet 110 connected to the steering shaft 20 via a gear part 12, and configured to rotate in r direction along with rotation of the steering shaft 20 in R direction.

The magnetic detector 10 is arranged such that a mounting surface of the substrate 101 faces a bottom surface of the magnet 110. A point 101c on the substrate 101 is a point that coincides with a rotation axis of the magnet 110. The Hall IC 100 is one package of two Hall ICs (Hall ICs $100_1$ and $100_2$ to be described later, FIG. 4). Each centre of magnetic detection of the Hall ICs does not coincide with the point 101c on the substrate 101, but is arranged at a position offset from the point 101c. The centre of the Hall IC 100 and the point 101c are made to coincide.

The magnet 110 is magnetized parallel to the bottom surface (upper surface) of a cylindrical column and rotates in direction r around a central axis perpendicular to the magnetization direction Dm and also perpendicular to the bottom (and/or upper) surface. The rotation of the magnet 110 changes the magnetic field at a magnetic detection point of the Hall IC 100. A specific change in the magnetic field will be described later in FIG. 7.

The gear part 12 includes a gear 120 configured to rotate around a shaft 120a along with the magnet 110, a gear 121 configured to rotate around the shaft 121a and a gear 122 configured to rotate along with the steering shaft 20. The gear part 12 is accommodated in a case (not shown) and the shafts 120a and 121a are held in holes provided on an inner wall of the case. The magnetic detector 10 may be accommodated in the case or may be disposed outside the case as long as the case is a non-magnetic body.

As an example, the Hall IC 100 is arranged at a position separated by 5 mm from the bottom surface of the magnet 110. Note that the two Hall ICs ($100_1$ and $100_2$, FIG. 4) included in the Hall IC 100 each are arranged at positions radially separated by 5 mm from the point 101c.

The magnet 110 is a permanent magnet formed by using a material such as ferrite, samarium cobalt, neodymium or the like. A size of the magnet is, for example, 20 mm in outer diameter and 5 mm in height.

Figure 4A:
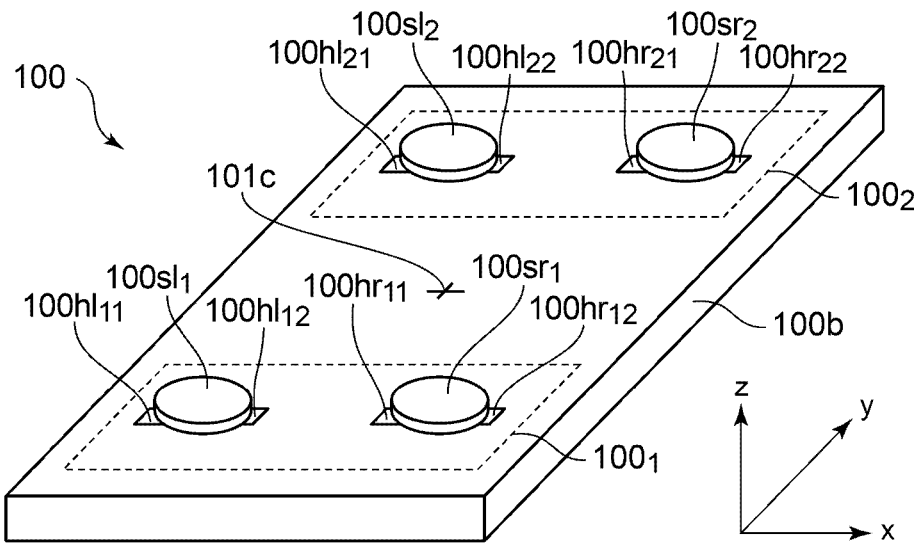
FIGS. 4(a) to 4(c) show a perspective view, a plan view and a cross-sectional view showing a configuration of the Hall IC.
Figure 4B:
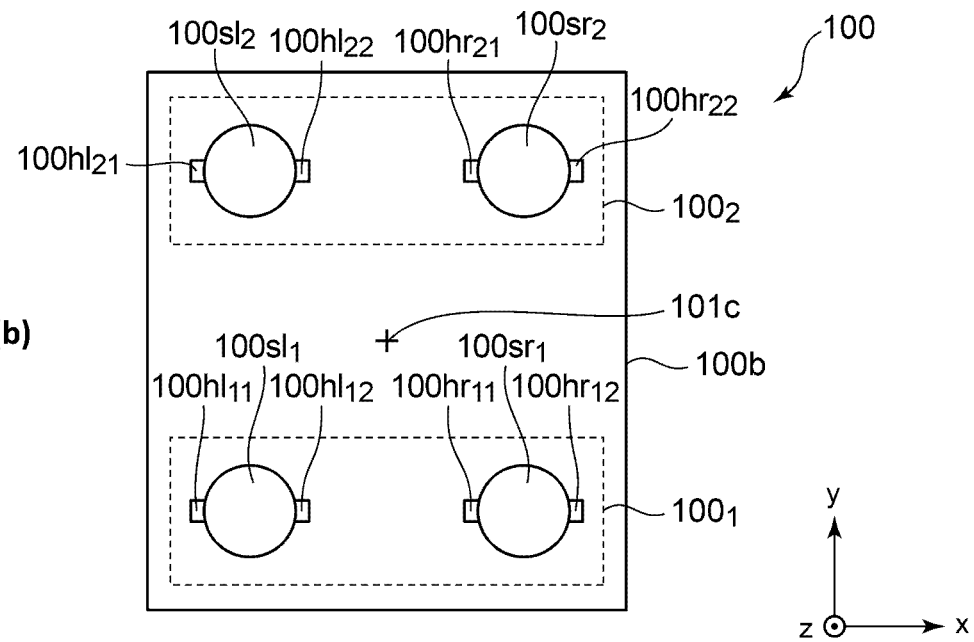
Figure 4C:
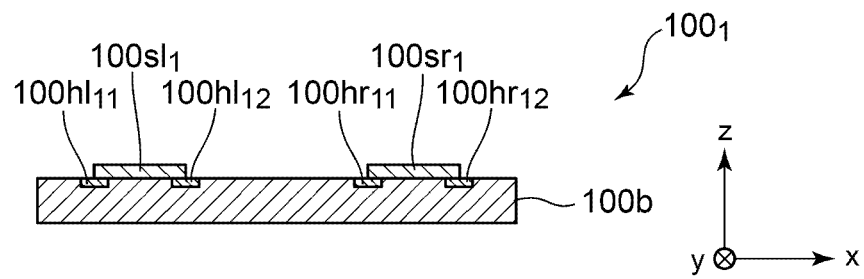

FIGS. 4(a) to 4(c) show a perspective view, a plan view and a cross-sectional view of a configuration of the Hall IC 100.

The Hall IC 100 comprises a substrate 100b, Hall plates $100hl_{11}$ and $100hl_{12}$ (also collectively referred to as a Hall plate $100hl_1$) (i.e. another first pair of magnetic detection elements) and Hall plates $100hr_{11}$ and $100hr_{12}$ (also collectively referred to as a Hall plate $100hr_1$) (i.e. another second pair of magnetic detection elements) being provided on the substrate 100b to have a detection surface parallel to the surface of the substrate 100b, and having a detection direction in a normal direction of the surface of the substrate 100b; a magnetic concentrator $100sl_1$ provided on the substrate 100b to overlap on a part of each of the Hall plates $100hl_{11}$ and $100hl_{12}$ and configured to convert magnetic flux in a direction orthogonal to the normal direction into said normal direction to allow the magnetic flux to be detected by the Hall plates $100hl_{11}$ and $100hl_{12}$; a magnetic concentrator $100sr_1$ provided on the substrate 100b to overlap on a part of each of the Hall plates $100hr_{11}$ and $100hr_{12}$, and configured to convert magnetic flux in the direction orthogonal to the normal direction into the normal direction to allow the magnetic flux to be detected by the Hall plates $100hr_{11}$ and $100hr_{12}$; and a signal processing unit ($100sp_1$, FIG. 5) configured to process signals output from the Hall plates $100hl_1$ and $100hr_1$, in which the Hall IC 100 detects a magnetic flux density in the normal direction and the direction orthogonal to the normal direction through signal processing described next. The Hall plates $100hl_1$ and $100hr_1$, the magnetic concentrators $100sl_1$ and $100sr_1$ and the signal processing part $100sp_1$ described above are referred to as a Hall IC $100_1$ (a first magnetic detection IC).

Additionally, the Hall IC 100 comprises a substrate 100b, Hall plates $100hl_{21}$ and $100hl_{22}$ (also collectively referred to as a Hall plate $100hl_2$) (a first pair of magnetic detection elements) and Hall plates $100hr_{21}$ and $100hr_{22}$ (also collectively referred to as a Hall plate $100hr_2$) (a second pair of magnetic detection elements) being provided on the substrate 100b to have a detection surface parallel to the surface of the substrate 100b, and having a detection direction in a normal direction of the surface of the substrate 100b; a magnetic concentrator $100sl_2$ provided on the substrate 100b to overlap on a part of each of the Hall plates $100hl_{21}$ and $100hl_{22}$, and configured to convert magnetic flux in a direction orthogonal to the normal direction into the normal direction to allow the magnetic flux to be detected by the Hall plates $100hl_{21}$ and $100hl_{22}$; a magnetic concentrator $100sr_2$ provided on the substrate 100b to overlap on a part of each of the Hall plates $100hr_{21}$ and $100hr_{22}$, and configured to convert magnetic flux in the direction orthogonal to the normal direction into the normal direction to allow the magnetic flux to be detected by the Hall plates $100hr_{21}$ and $100hr_{22}$; and a signal processing part ($100sp_2$, FIG. 5) configured to process signals output from the Hall plates $100hl_2$ and $100hr_2$, in which the Hall IC 100 detects a magnetic flux density in the normal direction and the direction orthogonal to the normal direction through signal processing described next. The Hall plates $100hl_2$ and $100hr_2$, the magnetic concentrators $100sl_2$ and $100sr_2$ and the signal processing part $100sp_2$ described above are referred to as a Hall IC $100_2$ (a second magnetic detection IC).

The point $101c$ is located between the Hall IC $100_1$ and the Hall IC $100_2$. The Hall IC $100$ is arranged such that the point $101c$ is at an equal distance from each of the magnetic concentrators $100sl_1$, $100sr_1$, $100sl_2$, and $100sr_2$.

In the Hall IC $100$, for example, a distance between the Hall plates $100hl_{11}$ and $100hl_{12}$, a distance between the Hall plates $100hr_{11}$ and $100hr_{12}$, a distance between the Hall plates $100hl_{21}$ and $100hl_{22}$, and a distance between the Hall plates $100hr_{21}$ and $100hr_{22}$ are 0.2 mm, a thickness of the substrate $100b$ is 0.5 mm, a width is 5 mm in y direction and 4.5 mm in x direction. For the magnetic concentrators $100sl_1$, $100sr_1$, $100sl_2$, and $100sr_2$, permalloy can be used. In addition, the magnetic concentrator $100sl_1$ and the magnetic concentrator $100sr_1$, as well as the magnetic concentrator $100sl_2$ and the magnetic concentrator $100sr_2$ are separated by 2 mm to be arranged. Further, the centre of the Hall IC $100_1$ and the centre of the Hall IC $100_2$ are separated by 3 mm in y direction, to be arranged. Here, the Hall IC $100_1$ and the Hall IC $100_2$ each are formed within a region of 2 mm in y direction and 3 mm in x direction, and as long as these sizes can be disposed, the size of the substrate $100b$ can be appropriately changed.

FIGS. 5(a) and 5(b) are block diagrams showing a configuration of the signal processing part of the Hall IC $100$, in which FIG. 5(a) illustrates the signal processing part of the Hall IC $100_1$, and FIG. 5(b) illustrates the signal processing of the Hall IC $100_2$.

As shown in FIG. 5(a), the signal processing part $100sp_1$ of the Hall IC $100_1$ comprises a multiplexer $100mux_1$ configured to sequentially output outputs from the Hall plates $100hl_{11}$, $100hl_{12}$, $100hr_{11}$ and $100hr_{12}$ to subsequent stages; an amplifier $100g_1$ configured to amplify the output of the multiplexer $100mux_1$; an A/D converter $100ad_1$ configured to convert an analog signal output from the amplifier $100g_1$ into a digital signal, a digital signal processor $100dsp_1$ configured to process the digital signal input from the A/D converter $100ad_1$; a D/A converter $100da_1$ configured to convert the digital signal output from the digital signal processor $100dsp_1$ into an analog signal and an output $100out_1$ configured to output the analog signal converted by the D/A converter $100da_1$, to the ECU 4.

The digital signal processor $100dsp_1$ calculates the outputs from the Hall plates $100hl_{11}$, $100hl_{12}$, $100hr_{11}$, and $100hr_{12}$, and stores necessary information. The digital signal processor $100dsp_1$ adds and subtracts the outputs of the Hall plates $100hl_{11}$ and $100hl_{12}$, adds and subtracts the outputs of the Hall plates $100hr_{11}$ and $100hr_{12}$ and then determines a rotation angle of the magnet $110$ by using the calculation results. A detailed calculation method will be described later.

Similarly, as shown in FIG. 5(b), the signal processing part $100sp_2$ of the Hall IC $100_2$ comprises a multiplexer $100mux_2$ configured to sequentially output outputs from the Hall plates $100hl_{21}$, $100hl_{22}$, $100hr_{21}$ and $100hr_{22}$ to subsequent stages; an amplifier $100g_2$ configured to amplify the output of the multiplexer $100mux_2$; an A/D converter $100ad_2$ configured to convert an analog signal output from the amplifier $100g_2$ into a digital signal; a digital signal processor $100dsp_2$ configured to process the digital signal input from the A/D converter $100ad_2$; a D/A converter $100da_2$ configured to convert the digital signal output from the digital signal processor $100dsp_2$ into an analog signal; and an output $100out_2$ configured to output the analog signal converted by the D/A converter $100da_2$, to the ECU 4.

The digital signal processor $100dsp_2$ similarly calculates the outputs from the Hall plates $100hl_{21}$, $100hl_{22}$, $100hr_{21}$ and $100hr_{22}$, and stores necessary information. Further, the digital signal processor $100dsp_2$ adds and subtracts the outputs of the Hall plates $100hl_{21}$ and $100hl_{22}$, adds and subtracts the outputs of the Hall plates $100hr_{21}$ and $100hr_{22}$, and then calculates the rotation angle of the magnet $110$ by using the calculation results.

FIG. 6 is a schematic cross-sectional view for explaining a magnetic-flux detection operation of the Hall IC $100$. While the Hall IC $100_1$ and the Hall IC $100_2$ included in the Hall IC $100$ operate in a similar manner, the Hall IC $100_1$ will be described as a representative example here.

In the Hall plates of the Hall IC $100_1$, the Hall plates $100hl_{11}$ and $100hl_{12}$ detect the magnetic flux density in a vertical direction of the drawing. When a horizontal component of the drawing of magnetic flux f is B// (Bx) and a vertical component of the drawing is Bz, horizontal component B// of the drawing is induced by the magnetic concentrator $100sl_1$ and detected as B⊥, so that the Hall plate $100hl_{11}$ detects "B⊥−Bz" and the Hall plate $100hl_{12}$ detects "−B⊥−Bz".

Therefore, a signal proportional to magnetic flux density 2B⊥ (hereinafter referred to as "Bxl") is obtained by taking a difference between the outputs of the Hall plates $100hl_{11}$ and $100hl_{12}$ with the signal processing part $100sp_1$, and a signal proportional to magnetic flux density −2Bz (hereinafter referred to as "Bzl") is obtained by taking a sum of the outputs of the Hall plates $100hl_{11}$ and $100hl_{12}$.

The operation of the Hall plates $100hl_{11}$ and $100hl_{12}$ described above can be similarly explained for the Hall plates $100hr_{11}$ and $100hr_{12}$. A signal proportional to magnetic flux density 2B⊥ (hereinafter referred to as "Bxr") is obtained by taking a difference between the outputs of the Hall plates $100hr_{11}$ and $100hr_{12}$ with the signal processing part $100sp_1$. A signal proportional to magnetic flux density −2Bz (hereinafter referred to as "Bzr") is obtained by taking a sum of the outputs of the Hall plates $100hr_{11}$ and $100hr_{12}$.

Since the Hall plate $100hl_1$ and the Hall plate $100hr_1$ are arranged separated by 2 mm, the Hall plate $100hl_1$ and the Hall plate $100hr_1$ each detect positionally different magnetic fields. Therefore, the difference between the outputs of the Hall plate $100hl_1$ and the Hall plate $100hr_1$ is calculated as ΔBx=Bxl−Bxr (a second magnetic flux density difference) and ΔBz=Bzl−Bzr (a first magnetic flux density difference).

Figure 7:
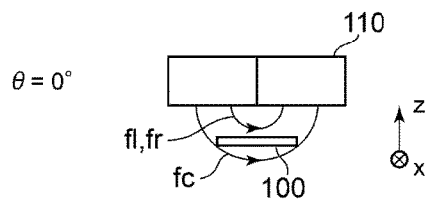
FIGS. 7(a1) to 7(a5) and 7(b1) to 7(b5) are schematic diagrams showing a relationship between a rotation angle of the magnet and magnetic flux to be detected by the Hall IC.
Figure 7:
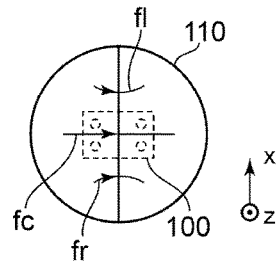
Figure 7:
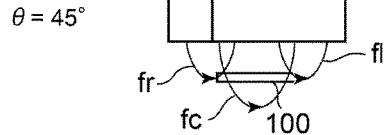
Figure 7:
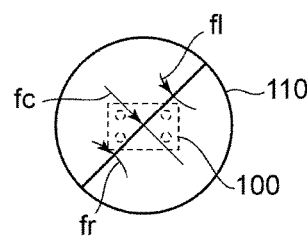
Figure 7:
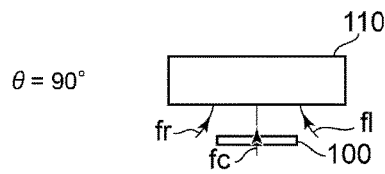
Figure 7:
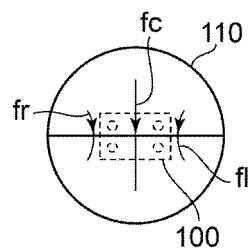
Figure 7:
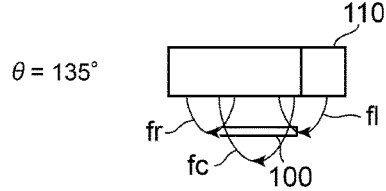
Figure 7:
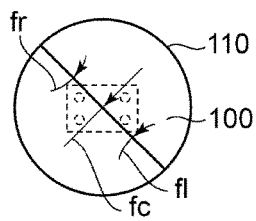
Figure 7:
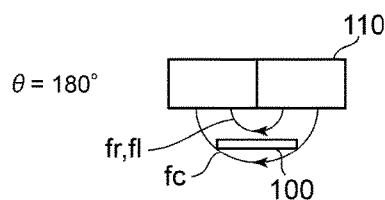
Figure 7:
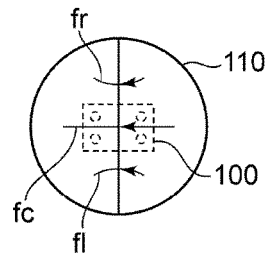

ΔBx and ΔBz change along with the rotation angle of the magnet $110$ and their correspondence will be described with reference to FIGS. 7 and 8. FIGS. 7(a1) to 7(a5) and 7(b1) to 7(b5) are schematic diagrams showing a relationship between a rotation angle of the magnet $110$ and magnetic flux to be detected by the Hall IC $100$, in which FIGS. 7(a1) to 7(a5) are front views and FIGS. 7(b1) to 7(b5) plan views. While the Hall IC $100_1$ and the Hall IC $100_2$ included in the Hall IC $100$ operate in a similar manner, the Hall IC $100_1$ will be described as a representative example here.

Figure 8A:
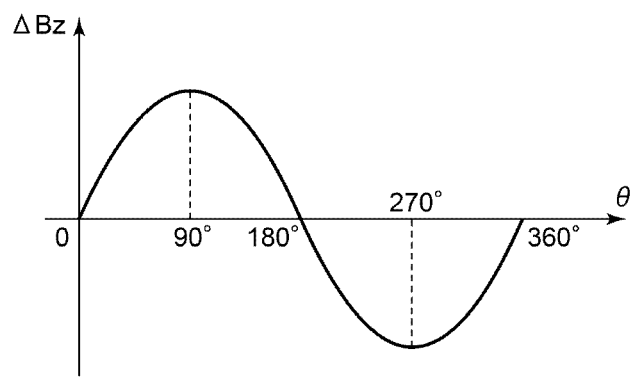
FIGS. 8(a) and 8(b) are graphs showing outputs $\Delta Bz$ and $\Delta Bx$ of the Hall IC, each relative to a rotation angle of the magnet.
Figure 8B:
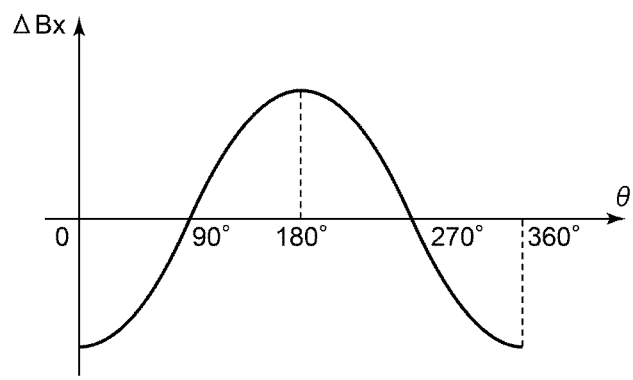

FIGS. 8(a) and 8(b) are graphs showing outputs ΔBz and ΔBx of the Hall IC $100_1$, each relative to the rotation angle of the magnet $110$. When the rotation angle of the magnet $110$ is θ=0° (FIGS. 7(a1) and 7(b1)), magnetic fields Bzl and Bzr, detected by the Hall plate $100hl_1$ and the Hall plate $100hr_1$, respectively, have same numerical values. Therefore, ΔBz=0. Moreover, magnetic fields Bxl and Bxr detected by the Hall plate $100hl_1$ and the Hall plate $100hr_1$, respectively, have same numerical values with reverse signs. Therefore, ΔBx has a negative maximum value. Next, when the rotation angle of the magnet $110$ is θ=90° (FIGS. 7(a3) and 7(b3)), magnetic fields Bzl and Bzr respectively detected by the Hall plate $100hl_1$ and the Hall plate $100hr_1$ have same numerical values with reverse signs. Therefore, ΔBz has a positive maximum value. Moreover, magnetic fields Bxl and Bxr detected by the Hall plate $100hl_1$ and the Hall plate $100hr_1$, respectively, have same numerical values. Therefore, ΔBx=0. Next, when the rotation angle of the magnet 110 is θ=180° (FIGS. 7(a5) and 7(b5)), magnetic fields Bzl and Bzr detected by the Hall plate $100hl_1$ and the Hall plate $100hr_1$, respectively, have same numerical values. Therefore, ΔBz=0. Moreover, magnetic fields Bxl and Bxr detected by the Hall plate $100hl_1$ and the Hall plate $100hr_1$, respectively, have same numerical values with reverse signs (opposite to the case of θ=0°). Therefore, ΔBx has a positive maximum value.

Considering the behaviour of ΔBz and ΔBx above, transition states θ=45° (FIGS. 7(a2) and 7(b2)), θ=135° (FIGS. 7(a4) and 7(b4)) and θ=180° to 360°, a relationship between rotation angle θ of the magnet 110 and ΔBz and ΔBx is such that ΔBz is proportional to sin θ and ΔBx is proportional to cos θ, as shown in FIGS. 8(a) and 8(b). Namely, ΔBz/ΔBx=k·sin θ/cos θ=k·tan θ, so that θ=arctan (K·ΔBz/ΔBx). Note that k is a constant for normalizing a magnitude of the amplitude of ΔBz and ΔBx, and K is the reciprocal of k.

The digital signal processor $100dsp_1$ of the signal processing part $100sp_1$ obtains outputs from the Hall plates $100hl_{11}$, $100hl_{12}$, $100hr_{11}$, and $100hr_{12}$ as digital signals via the multiplexer $100mux_1$, the amplifier $100g_1$ and the A/D converter $100ad_1$, and calculates θ from the outputs obtained based on the above-described calculation method. The θ calculated by the digital signal processor $100dsp_1$ is converted from a digital signal to an analog signal by the D/A converter $100da_1$, and the analog signal converted by the D/A converter $100da_1$ is output from the output $100out_1$ to the ECU 4.

Since it is necessary to determine k (or K) for calculating θ, the digital signal processor $100dsp_1$ has a calibration mode for determining k (or K). When the magnet 110 is rotated 360° in the calibration mode, the digital signal processor $100dsp_1$ records ΔBz and ΔBx. Next, the digital signal processor $100dsp_1$ calculates k (or K) from ΔBzmax and ΔBxmax, which are respective maximum values.

Further, as another example of the method for determining ΔBzmax and ΔBxmax, which are the maximum values, the digital signal processor $100dsp_1$ may determine ΔBzmax and ΔBxmax from differentiation of ΔBz and ΔBx (with respect to θ or time), namely, from ΔBz and ΔBx of an angle or timing at which an inclination becomes zero.

Since the Hall IC $100_1$ and the Hall IC $100_2$ is placed symmetrically with respect to a centre $100c$, θ' calculated by the digital signal processor $100dsp_2$ has a phase shifted by 180° with respect to θ, so that θ'=θ−180°. The phase shift (180°) may be corrected at the digital signal processor $100dsp_2$ and output as θ to the ECU 4, or may be output to the ECU 4 as θ' and then corrected to θ at the ECU 4.

According to the above-described embodiment, since the Hall IC $100_1$ and the Hall IC $100_2$ detect the rotation of the magnet 110 by using the difference of the magnetic field in x direction and the magnetic field in z direction between two points, the Hall IC $100_1$ and the Hall IC $100_2$ do not need to be arranged directly under the rotation centre of the magnet 110, but the Hall IC $100_1$ and the Hall IC $100_2$ can be arranged at a position offset from the rotation centre, and the Hall IC 100 can be made as one package of a plurality of rotation angle detectors (the Hall IC $100_1$ and the Hall IC $100_2$).

For each of the Hall IC $100_1$ and the Hall IC $100_2$ included in Hall IC 100, the Hall plates only need to be arranged in a single direction with respect to the rotating magnetic field and the Hall plates do not need to be arranged in a plurality of directions, enabling a compact IC compared with a conventional one.

A second embodiment is different from the first embodiment in that a magnet 110 has a semi-circular cylindrical shape and the range of rotation angles to be detected is 180°. Also, the Hall ICs are arranged offset from the rotation centre. Further, the second embodiment is applied to a throttle device such as a motorcycle or a scooter. The same reference numerals are given to the same configurations as those of the first embodiment.

Figure 9:
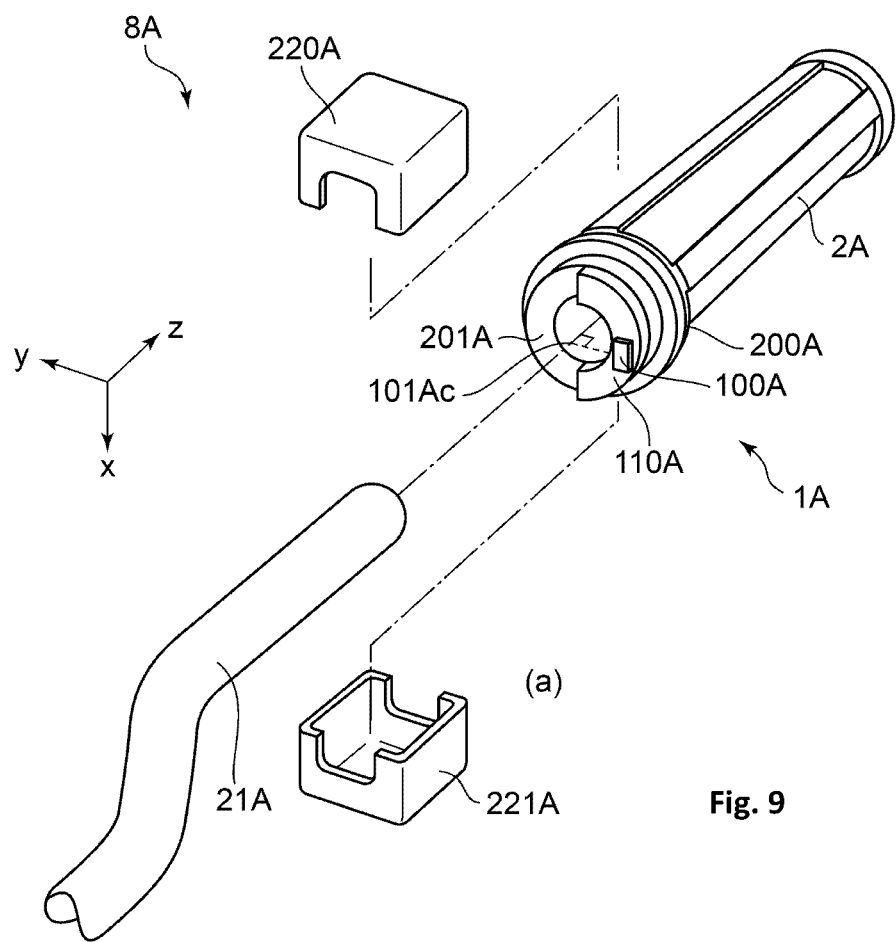
FIG. 9 provides an exploded perspective view showing a configuration example of a rotation angle detector according to a second embodiment.

FIG. 9 is an exploded perspective view showing a configuration example of a rotation angle detector according to the second embodiment. A throttle device 8A is, as an example, for controlling rotation of a motor of an electric motorcycle and comprises a throttle grip 2A to be gripped by a driver of the electric motorcycle; a cylindrical sleeve 200A configured to rotate while an outer wall of the cylindrical sleeve 200A and an inner wall of the throttle grip 2A are fixed, and an inner wall the cylindrical sleeve 200A and an outer wall of a handlebar 21A slide; a mount 201A provided at one end of the sleeve 200A and configured to fix a magnet 110A; the handlebar 21A configured to steer the motorcycle, and a switch box including a case upper part 220A and a case lower part 221A configured to accommodate a switch, a harness, and the like which are not shown, and rotatably hold the sleeve 200A. The rotation angle detector 1A according to the second embodiment has a magnetic detector mounted with a Hall IC 100A on a substrate (not shown), and a semi-circular cylindrical magnet 110A that integrally rotates with the throttle grip 2A.

Figures 10A, 10B, 10C:
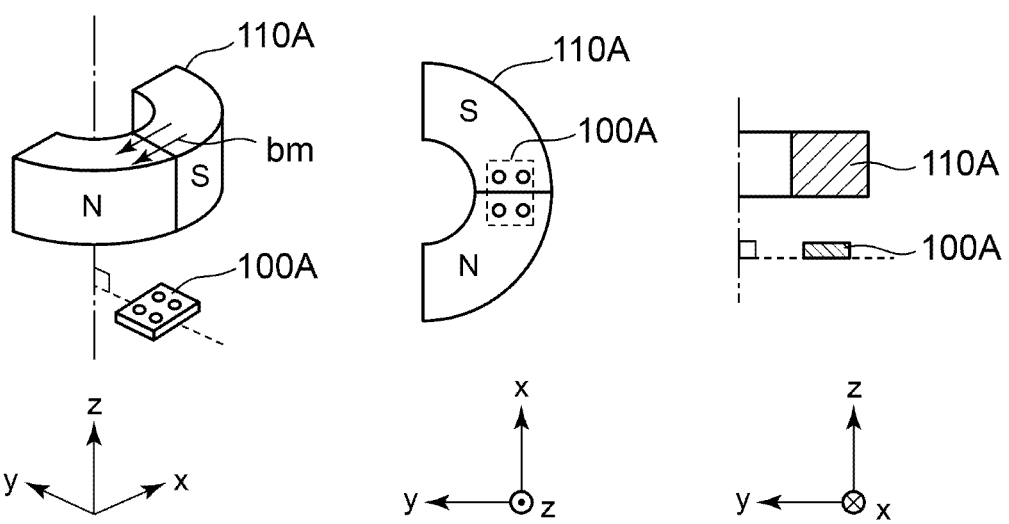
FIGS. 10(a) to 10(c) illustrate a perspective view, a plan view and a front view for explaining a positional relationship between the Hall IC and a magnet.

FIGS. 10(a) to 10(c) are a perspective view, a plan view, and a front view for explaining a positional relationship between the Hall IC and the magnet. The Hall IC 100A is one package of the two Hall ICs (Hall ICs $100_1$ and $100_2$, FIG. 11). Each centre of magnetic detection of the Hall ICs does not coincide with a rotation axis of the sleeve 200A, but is arranged at a position offset from the rotational axis. The centre of the Hall IC 100A and the rotation axis are not made to coincide. The magnet 110A is magnetized parallel to the bottom surface (upper surface) of the cylinder and the magnetization direction Dm is tangential to the rotation axis. The rotation of the magnet 110A changes the magnetic field at a magnetic detection point of the Hall IC 100A. The magnet 110A is a permanent magnet formed by using a material such as ferrite, samarium cobalt, neodymium or the like. A size of the magnet is, for example, 20 mm in outer diameter and 10 mm in height.

Figure 11A:
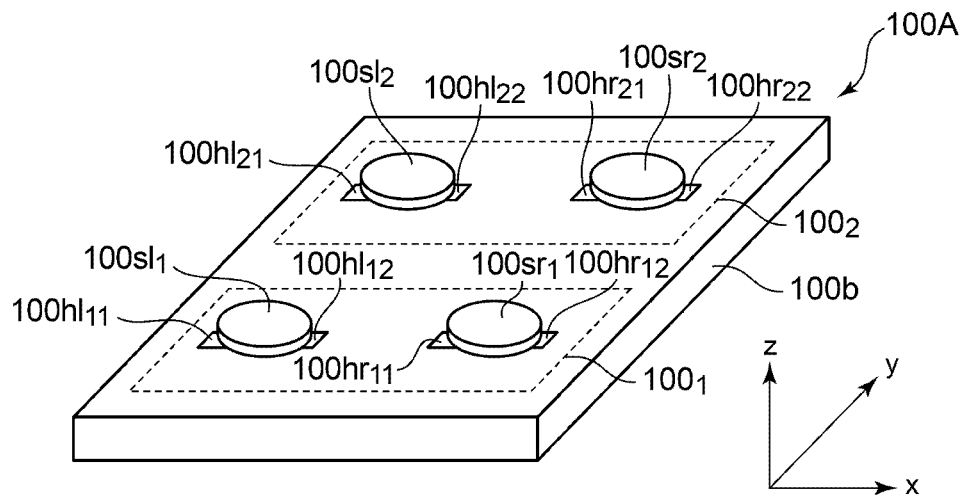
FIGS. 11(a) to 11(c) illustrate a perspective view, a plan view and a cross-sectional view showing a configuration of the Hall IC.
Figure 11B:
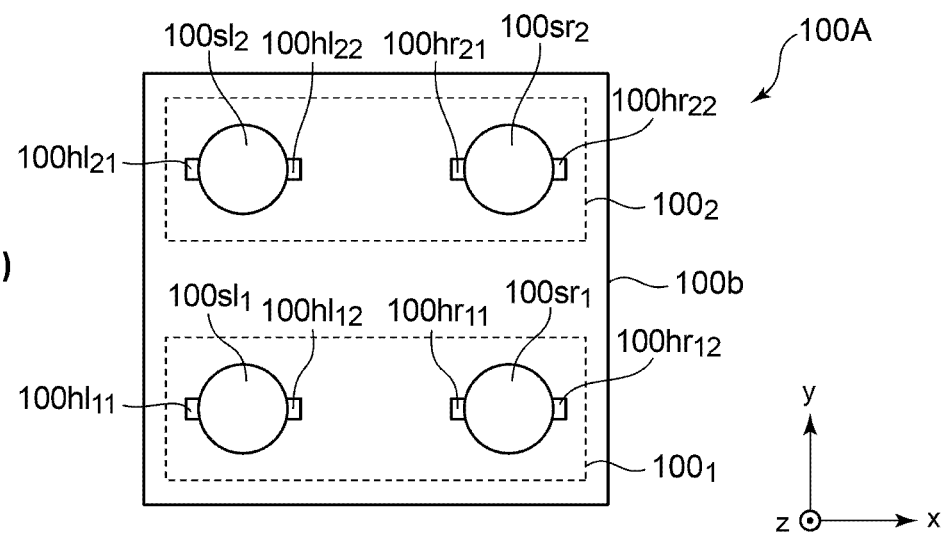
Figure 11C:
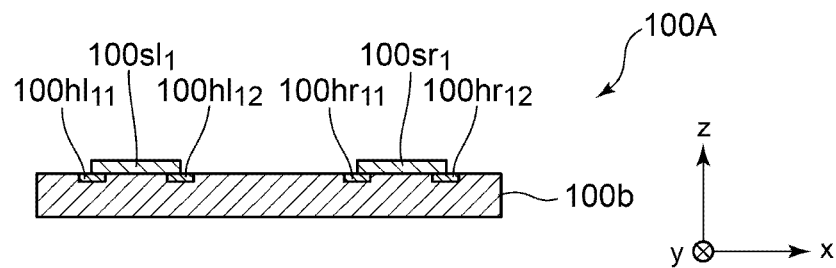

FIGS. 11(a) to 11(c) are a perspective view, a plan view and a cross-sectional view showing a configuration of the Hall IC 100A. The Hall IC 100A has: a substrate 100b; Hall plates $100hl_{11}$ and $100hl_{12}$ (a first pair of magnetic detection elements) and Hall plates $100hr_{11}$ and $100hr_{12}$ (a second pair of magnetic detection elements) being provided on the substrate 100b to have a detection surface parallel to the surface of the substrate 100b and having a detection direction in a normal direction of the surface of the substrate 100b, similarly to the first embodiment; a magnetic concentrator $100sl_1$ provided on the substrate 100b to overlap on a part of each of the Hall plates $100hl_{11}$ and $100hl_{12}$, and configured to convert magnetic flux in a direction orthogonal to the normal direction into the normal direction to allow the magnetic flux to be detected by the Hall plates $100hl_{11}$ and $100hl_{12}$; a magnetic concentrator $100sr_1$ provided on the substrate 100b to overlap on a part of each of the Hall plates $100hr_{11}$ and $100hr_{12}$, and configured to convert magnetic flux in the direction orthogonal to the normal direction into the normal direction to allow the magnetic flux to be detected by the Hall plates $100hr_{11}$ and $100hr_{12}$; and a signal processing part ($100sp_1$, FIG. 5) configured to process signals output from the Hall plates $100hl_1$ and $100hr_1$, in which the Hall IC 100A detects a magnetic flux density in the normal direction and the direction orthogonal to the normal direction. The Hall plates $100hl_1$ and $100hr_1$, the magnetic concentrators $100sl_1$ and $100sr_1$ and the signal processing part $100sp_1$ described above are referred to as a Hall IC $100_1$.

Additionally, the Hall IC 100 comprises: a substrate 100b, Hall plates $100hl_{21}$ and $100hl_{22}$ (a first pair of magnetic detection elements) and Hall plates $100hr_{21}$ and $100hr_{22}$ (a second pair of magnetic detection elements) being provided on the substrate 100b to have a detection surface parallel to the surface of the substrate 100b, and having a detection direction in a normal direction of the surface of the substrate 100b, similarly to the first embodiment; a magnetic concentrator $100sl_2$ provided on the substrate 100b to overlap on a part of each of the Hall plates $100hl_{21}$ and $100hl_{22}$, and configured to convert magnetic flux in a direction orthogonal to the normal direction into the normal direction to allow the magnetic flux to be detected by the Hall plates $100hl_{21}$ and $100hl_{22}$; a magnetic concentrator $100sr_2$ provided on the substrate 100b to overlap on a part of each of the Hall plates $100hr_{21}$ and $100hr_{22}$, and configured to convert magnetic flux in the direction orthogonal to the normal direction into the normal direction to allow the magnetic flux to be detected by the Hall plates $100hr_{21}$, and $100hr_{22}$; and a signal processing part ($100sp_2$, FIG. 5) configured to process signals output from the Hall plates $100hl_2$ and $100hr_2$, in which the Hall IC 100 detects a magnetic flux density in the normal direction and the direction orthogonal to the normal direction. The Hall plates $100hl_2$ and $100hr_2$, the magnetic concentrators $100sl_2$ and $100sr_2$ and the signal processing part $100sp_2$ described above are referred to as a Hall IC $100_2$.

Unlike the first embodiment, the rotation axis of the sleeve 200A is not located between the Hall IC $100_1$ and the Hall IC $100_2$. Both the Hall IC $100_1$ and the Hall IC $100_2$ are offset from the rotation axis of the sleeve 200A.

In the Hall IC 100A, for example, a distance between the Hall plates $100hl_{11}$ and $100hl_{12}$, a distance between the Hall plates $100hr_{11}$ and $100hr_{12}$, a distance between the Hall plates $100hl_{21}$ and $100hl_{22}$ and a distance between the Hall plates $100hr_{21}$ and $100hr_{22}$ are 0.2 mm, a thickness of the substrate 100b is 0.5 mm, a width in y direction is 5 mm, and a width in x direction is 4.5 mm. For the magnetic concentrators $100sl_1$, $100sr_1$, $100sl_2$ and $100sr_2$, permalloy can be used. In addition, the magnetic concentrator $100sl_1$ and the magnetic concentrator $100sr_1$, as well as the magnetic concentrator $100sl_2$ and the magnetic concentrator $100sr_2$ are separated by 2 mm to be arranged. Further, the centre of the Hall IC $100_1$ and the centre of the Hall IC $100_2$ are separated by 3 mm in y direction to be arranged, or the distance may be narrower than 3 mm. Here, the Hall IC $100_1$ and the Hall IC $100_2$ each are formed within a region of 2 mm in y direction and 3 mm in x direction, and as long as these sizes can be disposed, the size of the substrate 100b can be appropriately changed.

In the above configuration, when a driver of the electric motorcycle rotates the throttle grip 2A, the sleeve 200A and the magnet 110A fixed to the mount 201A are rotated. The rotation angle detector 1A detects a rotation angle of the throttle grip 2A and outputs a detection signal corresponding to rotation angle θ detected by the Hall IC $100_1$ and the Hall IC $100_2$. Unlike the first embodiment, there is no phase difference between rotation angles θ detected by the Hall IC $100_1$ and the Hall IC $100_2$, but consistent rotation angles θ are detected.

When a detection signal is input from the Hall IC $100_1$ and the Hall IC $100_2$, the ECU or the motor control device, which is not shown, controls the rotation of the motor of the electric motorcycle in accordance with the detection signal. It should be noted that the throttle grip 2A and the sleeve 200A rotate around the handlebar 21A by less than 180°, and FIG. 9 shows a state in which the driver has rotated the throttle grip 2A by 90°.

According to the above-described embodiment, the same effects as those of the first embodiment can be applied to a throttle of an electric motorcycle. In other words, the rotation angle detector 1A with a compact IC as compared with a conventional one can be applied to the throttle device 8A of the electric motorcycle. Further, since the Hall IC 100A can be arranged at a position offset from the rotation centre, and the restriction on arrangement can be reduced as compared with a conventional one, the rotation angle detector 1A can be used even when the handlebar 21A occupies a space of the rotation centre.

Figure 15A:
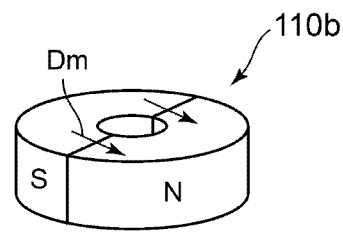
FIGS. 15(a) and 15(b) illustrate perspective views showing modified examples of a shape and a magnetization direction of the magnet.
Figure 15B:
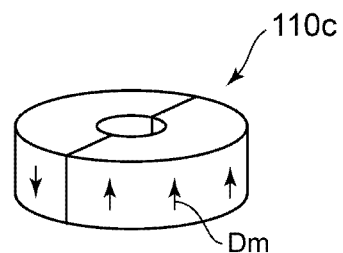

Further, since the magnet 110A is obtained by dividing a cylindrical shape into two parts, the magnet 110A is easily installed on the handlebar 21A as compared with a cylindrical magnet (e.g., a magnet 110b (FIG. 15(a)) or a magnet 110c (FIG. 15(b)) and the rotation angle detector 1A can be introduced without requiring a design change of the throttle device or as an alternative component of a component constituting a conventional throttle device.

Modified Example

It should be noted that the present invention is not limited to the embodiment described above and various modifications can be made without departing from the subject matter of the present invention. For example, the Hall ICs 100 and 100A may be replaced with the following. FIG. 12 is a plan view showing a modified example of the Hall IC. Similarly to the Hall IC 100 of the first embodiment and the Hall IC 100A of the second embodiment, a Hall IC 100B has two Hall ICs $100_1$ and $100_2$, and arranged at an angle of 90° with respect to a point 101Bc, which is an intersection point with a rotation axis of a magnet. Rotation angles to be detected by the two Hall ICs $100_1$ and $100_2$ are different in phases by 90° with each other.

FIG. 13 is a plan view showing a modified example of the Hall IC. Similarly to the Hall IC 100 of the first embodiment and the Hall IC 100A of the second embodiment, a Hall IC 100C has two Hall ICs $100_1$ and $100_2$, and arranged at an angle of 45° with respect to a point 101Cc, which is an intersection point with a rotation axis of a magnet. Rotation angles to be detected by the two Hall ICs $100_1$ and $100_2$ are different in phases by 45° with each other. Further, the two Hall ICs $100_1$ and $100_2$ may be arranged at an arrangement angle other than 90° and 45° described above. In other words, the two Hall ICs $100_1$ and $100_2$ may be arranged at any angle with respect to an intersection point with the rotation axis of the magnet and when the arrangement angle of the Hall IC 100 of the first embodiment is 180°, it can also be expressed as a case where the Hall IC 100A of the second embodiment is arranged at the angle 0°.

In addition, the magnet 110 and the magnet 110a may be replaced with the following. FIGS. 14(a) and 14(b) are perspective views showing a modified example of a magnetization direction of the magnet. The magnet 110 shown in FIG. 14(a) is same as the magnet 110 of the first embodiment and is shown for comparison with modified examples of other implementations of magnets. The magnet 110 has a magnetization direction Dm in a direction orthogonal to an axis of a cylindrical column in a columnar shape. A magnet 110*a* shown in FIG. 14(*b*) is obtained by dividing a columnar shape into two parts by a plane passing through the axis of a cylindrical column, and magnetization directions Dm of individual parts are parallel to the axial direction of the cylindrical column, and are in mutually opposite directions. Since this configuration causes formation of an external magnetic field equivalent to that of the magnet 110 at a magnetic detection position of the Hall IC 100, the magnet 110 may be replaced with the magnet 110*a* as it is.

FIGS. 15(*a*) and 15(*b*) are perspective views showing modified examples of a shape and a magnetization direction of the magnet. The magnet 110*b* shown in FIG. 15(*a*) has a cylindrical shape and has magnetization direction Dm in a direction orthogonal to an axis of the cylindrical shape. Since this configuration causes formation of an external magnetic field equivalent to that of the magnet 110 at a magnetic detection position of the Hall IC 100, the magnet 110 may be replaced with the magnet 110*b* as it is. The magnet 110*c* shown in FIG. 15(*b*) has a cylindrical shape and is obtained by dividing the cylindrical shape into two parts by a plane passing through the axis of the cylinder, and magnetization directions Dm of individual parts are parallel to the axial direction of the cylinder, and are in mutually opposite directions. Since this configuration causes formation of an external magnetic field equivalent to that of the magnet 110 at a magnetic detection position of the Hall IC 100, the magnet 110 may be replaced with the magnet 110*c* as it is.

FIGS. 16(*a*) and 16(*b*) are perspective views showing modified examples of a shape and a magnetization direction of the magnet. A magnet 110*d* shown in FIG. 16(*a*) is one of parts obtained by dividing a cylindrical shape by a plane passing through an axis of the cylinder, and has magnetization direction Dm in a direction orthogonal to an axis of the cylindrical shape. Since this configuration causes formation of an external magnetic field equivalent to that of the magnet 110 within a range of a rotation angle of 180° where the magnet 110*d* and the Hall IC 100 overlap in a plan view with the axis of the cylinder as a normal line, the magnet 110*d* may be replaced by the magnet 110*d* when being used within the above-described range of the rotation angle. Further, the magnet 110*d* can be used as the magnet 110A of the second embodiment. The magnet 110*d* may be formed not only in a semicircle but also at any angle. The rotation angle can be detected with a rotation angle at which the magnet 110*d* and the Hall IC 100 overlap in a plan view with the axis of the cylinder as a normal line.

A magnet 110*e* shown in FIG. 16(*b*) is one of parts obtained by dividing a cylindrical shape by a plane passing through an axis of the cylinder, and the shape is further divided into three parts by a plane passing through the axis of the cylinder, in which magnetization directions Dm of individual parts are parallel to the axial direction of the cylinder, and are in mutually opposite directions. Since this configuration causes formation of an external magnetic field equivalent to that of the magnet 110 within a range of a rotation angle of less than 180° where the magnet 110*e* and the Hall IC 100 overlap in a plan view with the axis of the cylinder as a normal line, the magnet 110*e* may be replaced by the magnet 110*e* when being used within the above-described range of the rotation angle. Further, the magnet 110*e* can be used as the magnet 110A of the second embodiment. The magnet 110*e* may be formed not only in a semicircle but also at any angle, and the rotation angle can be detected with a rotation angle at which the magnet 110*e* and the Hall IC 100 overlap in a plan view with the axis of the cylinder as a normal line.

Although the illustrated magnets 110, 110*a* to 110*e*, 110*a*1 and 110*a*2 are columnar or cylindrical, the shape of the magnets may be any polygonal column shape and is not limited as long as the magnetic flux density to be detected by the rotation angle detector 1 or 1A can periodically change and the rotation angle can be uniquely determined with the change.

Further, the Hall IC 100 and the Hall IC 100A may be arranged as follows. FIGS. 17(*a*) to 17(*c*) are perspective views showing modified examples of an arrangement of the Hall IC 100. The arrangement of the Hall IC 100 with respect to the magnet 110 shown in FIG. 17(*a*) is the same as that in the first embodiment, and is shown for comparison with modified examples of other arrangements of the Hall IC 100. In this arrangement the magnet 110 may be the magnet 110*a* (FIG. 14(*a*)), the magnet 110*b* (FIG. 15(*a*)), the magnet 110*c* (FIG. 15(*b*)), the magnet 110*d* (FIG. 16(*a*)) or the magnet 110*e* (FIG. 16(*b*)).

The arrangement of the Hall IC 100 with respect to the magnet 110 shown in FIG. 17(*b*) is same as the first embodiment and the second embodiment in that the arrangement of the Hall IC 100 is offset from the axis of the cylindrical column of the magnet 110. However, it is different in that the offset amount is larger than a radius of the cylindrical column and the magnet 110 and the Hall IC 100 do not overlap each other even when the magnet 110 is rotated in a plan view in which the axis of the cylindrical column is a normal line. In this arrangement the magnet 110 may be the magnet 110*b* (FIG. 15(*a*)) or the magnet 110*d* (FIG. 16(*a*)).

The arrangement of the Hall IC 100 with respect to the magnet 110 shown in FIG. 17(*c*) is the same as the first embodiment and the second embodiment in that the arrangement of the Hall IC 100 is offset from the axis of the cylindrical column of the magnet 110. However, it is different in that the offset amount is larger than a radius of the cylindrical column; the magnet 110 and the Hall IC 100 do not overlap each other even when the magnet 110 is rotated in a plan view in which the axis of the cylindrical column is a normal line; the magnetic detection direction of the Hall IC 100 is the circumferential direction of the magnet 110; and the arrangement in z direction is between an upper surface and a bottom surface of the cylindrical column of the magnet 110. In this arrangement the magnet 110 may be the magnet 110*b* (FIG. 15(*a*)) or the magnet 110*d* (FIG. 16(*a*)).

Moreover, the magnet 110 and the magnet 110A may be replaced by the following, in accordance with a rotation angle to be detected by the rotation angle detector 1 and the rotation angle detector 1A. FIGS. 18(*a*) to 18(*c*) are perspective views showing modified examples of a detection angle and a magnetization direction of the magnet. The magnet 110*a* shown in FIG. 18(*a*) is the same as the magnet 110*a* shown in FIG. 14(*b*) and is shown for comparison with modified examples of other magnets. The magnet 110*a* is obtained by dividing a columnar shape into two parts by a plane passing through the axis of a cylindrical column (division: ½), and magnetization directions Dm of individual parts are parallel to the axial direction of the cylindrical column, and are in mutually opposite directions. As shown in the first embodiment, the rotation angle that can be detected by the rotation angle detector 1 by using this magnet 110*a* is 360°. A magnet 110*a*1 shown in FIG. 18(*b*) is obtained by dividing a columnar shape into four parts by a plane passing through the axis of a cylindrical column (division: ¼), and magnetization directions Dm of individual parts are parallel to the axial direction of the cylindrical column, and are in mutually opposite directions. Since the magnetic field formed by the magnet 110a1 at a magnetic detection position of the Hall IC 100 has a period of 180°, the rotation angle that can be detected by the rotation angle detector 1 by using the magnet 110a1 is 180°. A magnet 110a2 shown in FIG. 18(c) is obtained by dividing a columnar shape into eight parts by a plane passing through the axis of a cylindrical column (division: ⅛), and magnetization directions Dm of individual parts are parallel to the axial direction of the cylindrical column, and are in mutually opposite directions. Since the magnetic field formed by the magnet 110a2 at a magnetic detection position of the Hall IC 100 has a period of 90°, the rotation angle that can be detected by the rotation angle detector 1 by using the magnet 110a2 is 90°.

Figure 18A:
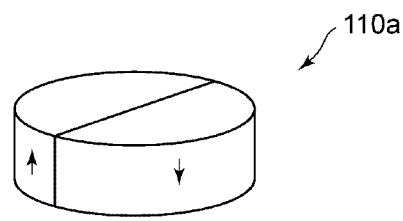
FIGS. 18(a) to 18(c) illustrate perspective views showing modified examples of a detection angle and a magnetization direction of the magnet.
Figure 18B:
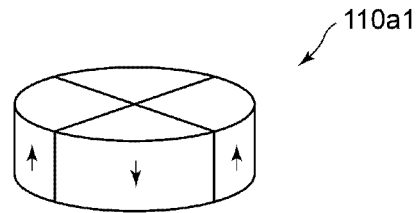
Figure 18C:
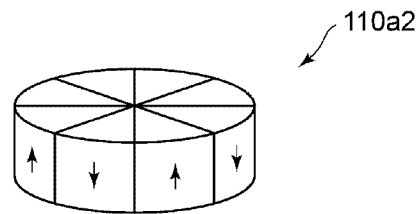

A relationship between the number of divisions and the detection angles shown in FIGS. 18(a) to 18(c) described above is similarly applied to the magnet 110 (FIG. 14(a)), the magnet 110b (FIG. 15(a)), and the magnet 110c (FIG. 15(b)). Further, in the case of the magnet 110d (FIG. 16(a)) or the magnet 110e (FIG. 16(b)), the detection angle is further halved.

Although the magnets 110a, 110c, 110e, 110a1 and 110a2 described above have different magnetization directions for individual parts of the magnet, a plurality of magnets may be prepared and arranged such that the magnetization directions of the adjacent magnets are different from each other, and the whole of the magnets may be molded with resin or the like so as to generate the same magnetic field.

Figure 19A:
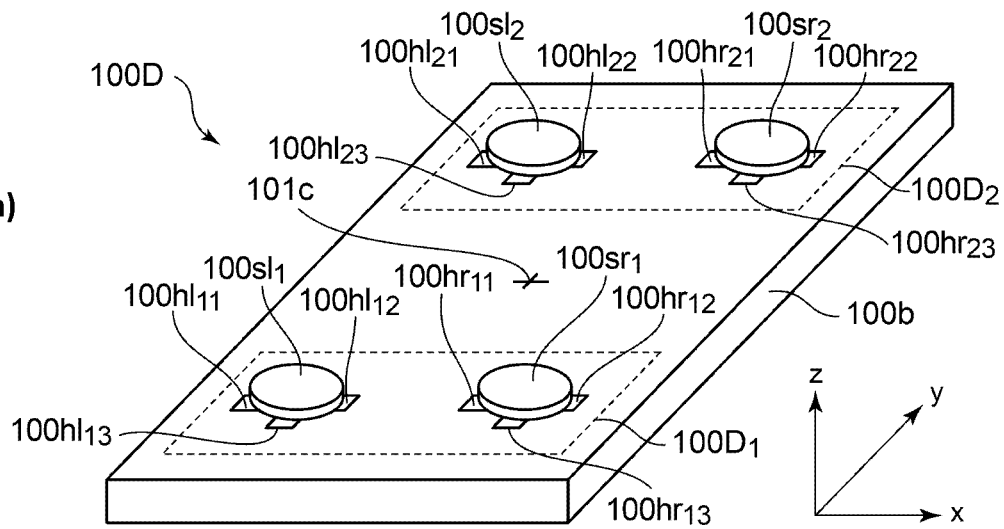
FIGS. 19(a) to 19(c) illustrate a perspective view, a plan view and a cross-sectional view showing a configuration of the Hall IC, according to a third embodiment.
Figure 19B:
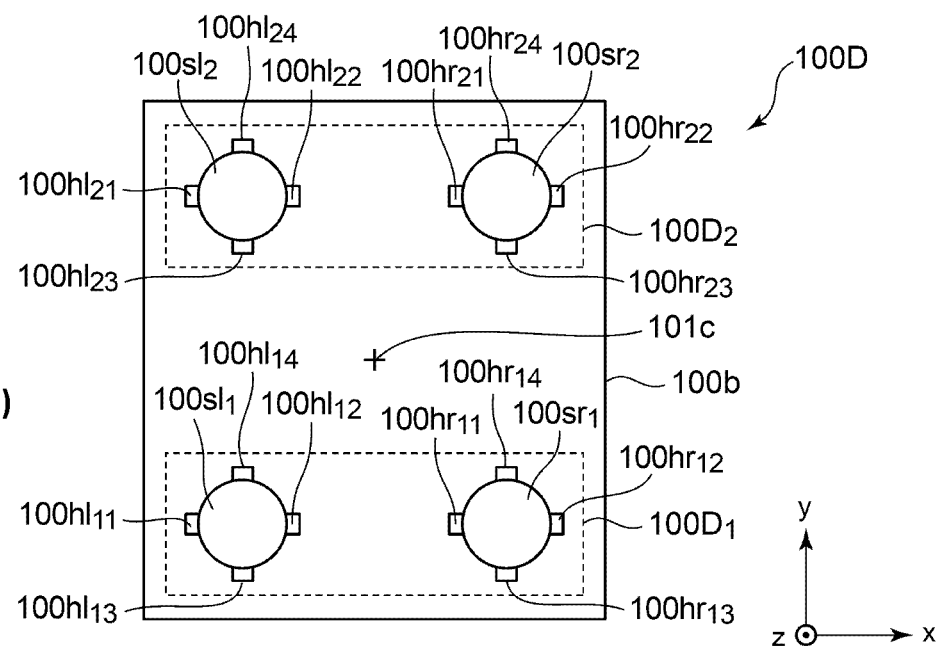
Figure 19C:
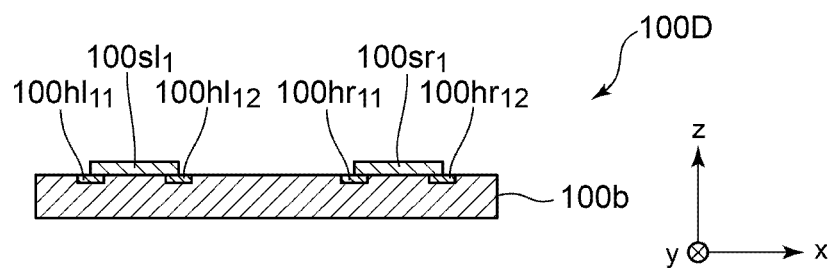

The third embodiment is different from the first embodiment in that a pair of Hall plates configured to detect a magnetic flux density in y direction is added, and a rotation angle of a magnet is detected based on a difference in the magnetic flux density in y direction and a difference in the magnetic flux density in x direction. Hereinafter, a case where a Hall IC of the third embodiment is applied to the rotation angle detector 1 of the first embodiment will be described. Moreover, the Hall IC of the third embodiment may be applied to the rotation angle detector 1A of the second embodiment. FIGS. 19(a) to 19(c) are a perspective view, a plan view and a cross-sectional view showing a configuration of the Hall IC, according to a third embodiment.

The Hall IC 100D comprises a substrate 100b; two pairs of magnetic detection elements (a first set of two pairs of magnetic detection elements) comprising Hall plates $100hl_{11}$ and $100hl_{12}$ (also collectively referred to as a Hall plate $100hlx_1$) and Hall plates $100hl_{13}$, $100hl_{14}$ (also collectively referred to as a Hall plate $100hly_1$), and two pairs of magnetic detection elements (a second set of two pairs of magnetic detection elements) comprising Hall plates $100hr_{11}$ and $100hr_{12}$ (also collectively referred to as a Hall plate $100hrx_1$) and Hall plates $100hr_{13}$, $100hr_{14}$ (also collectively referred to as a Hall plate $100hry_1$), being provided on the substrate 100b to have a detection surface parallel to the surface of the substrate 100b, and having a detection direction in a normal direction of the surface of the substrate 100b; a magnetic concentrator $100sl_1$ provided on the substrate 100b to overlap on a part of each of the Hall plates $100hlx_1$ and $100hly_1$, and configured to convert magnetic flux in the direction orthogonal to the normal direction into the normal direction to allow the magnetic flux to be detected by the Hall plates $100hlx_1$ and $100hly_1$; a magnetic concentrator $100sr_1$ provided on the substrate 100b to overlap on a part of each of the Hall plates $100hrx_1$ and $100hry_1$, and configured to convert magnetic flux in the direction orthogonal to the normal direction into the normal direction to allow the magnetic flux to be detected by the Hall plates $100hrx_1$ and $100hry_1$; and a signal processing part configured to process signals output from the Hall plates $100hlx_1$, $100hly_1$, $100hrx_1$ and $100hry_1$, in which the Hall IC 100D detects magnetic flux densities in x and y directions through signal processing described next. The Hall plates $100hlx_1$, $100hly_1$, $100hrx_1$ and $100hry_1$, the magnetic concentrators $100sl_1$ and $100sr_1$ and the signal processing part described above are referred to as a Hall IC $100D_1$.

Additionally, the Hall IC 100D has: two pairs of magnetic detection elements (a first set of two pairs of magnetic detection elements) comprising Hall plates $100hl_{21}$ and $100hl_{22}$ (also collectively referred to as a Hall plate $100hlx_2$) and Hall plates $100hl_{23}$, $100hl_{24}$ (also collectively referred to as a Hall plate $100hly_2$) and two pairs of magnetic detection elements (a second set of two pairs of magnetic detection elements) comprising Hall plates $100hr_{21}$ and $100hr_{22}$ (also collectively referred to as a Hall plate $100hrx_2$) and Hall plates $100hr_{23}$, $100hr_{24}$ (also collectively referred to as a Hall plate $100hry_2$), having a detection direction in a normal direction of the surface of the substrate 100b; a magnetic concentrator $100sl_2$ provided on the substrate 100b to overlap on a part of each of the Hall plates $100hlx_2$ and $100hly_2$ and configured to convert magnetic flux in the direction orthogonal to the normal direction into the normal direction to allow the magnetic flux to be detected by the Hall plates $100hlx_2$ and $100hly_2$; a magnetic concentrator $100sr_2$ provided on the substrate 100b to overlap on a part of each of the Hall plates $100hrx_2$ and $100hry_2$, and configured to convert magnetic flux in the direction orthogonal to the normal direction into the normal direction to allow the magnetic flux to be detected by the Hall plates $100hrx_2$ and $100hry_2$; and a signal processing part configured to process signals output from the Hall plates $100hlx_2$, $100hly_2$, $100hrx_2$, and $100hry_2$, in which the Hall IC 100D detects magnetic flux densities in x and y directions through signal processing described next. The Hall plates $100hlx_2$, $100hly_2$, $100hrx_2$ and $100hry_2$, the magnetic concentrators $100sl_2$ and $100sr_2$ and the signal processing part described above are referred to as a Hall IC $100D_2$.

A detection operation for the magnetic flux density in y direction is same as the detection operation for the magnetic flux density in x direction described in FIG. 6 and is explained by setting By for horizontal component B// of the drawing of magnetic flux f.

Figure 20A:
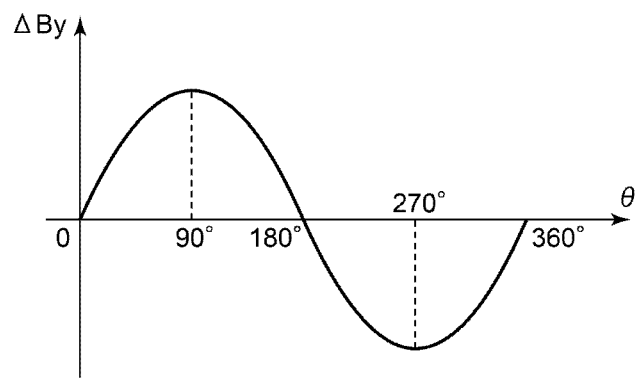
FIGS. 20(a) and 20(b) illustrate graphs showing outputs $\Delta By$ and $\Delta Bx$ of the Hall IC, each relative to a rotation angle of the magnet.
Figure 20B:
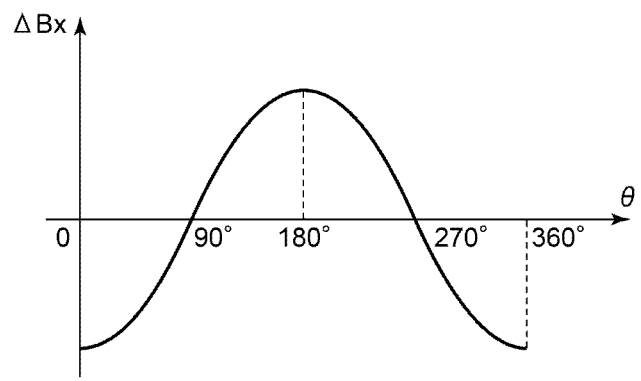

FIGS. 20(a) and 20(b) are graphs showing outputs ΔBy and ΔBx of the Hall IC, each relative to the rotation angle of the magnet. Since a relationship between the rotation angle of the magnet and the magnetic field to be formed is same as that in the first embodiment, the description is given with reference to FIG. 7.

When the rotation angle of the magnet 110 is θ=0° (FIGS. 7(a1) and 7(b1)), magnetic fields $Byl_1$ and $Byr_1$ respectively detected by the Hall plate $100hly_1$ and the Hall plate $100hry_1$ have same numerical values. Therefore, $\Delta By_1$ (a third magnetic flux density difference) is $\Delta By_1=0$. Moreover, magnetic fields $Bxl_1$ and $Bxr_1$ respectively detected by the Hall plate $100hlx_1$ and the Hall plate $100hrx_1$ have same numerical values with reverse signs. Therefore, $\Delta Bx_1$ has a negative maximum value. Next, when the rotation angle of the magnet 110 is θ=90° (FIGS. 7(a3) and 7(b3)), magnetic fields $Byl_1$ and $Byr_1$ respectively detected by the Hall plate $100hly_1$ and the Hall plate $100hry_1$ have same numerical values with reverse signs. Therefore, $\Delta By_1$ has a positive maximum value. Moreover, magnetic fields $Bxl_1$ and $Bxr_1$ respectively detected by the Hall plate $100hlx_1$ and the Hall plate $100hrx_1$ have same numerical values. Therefore, $\Delta Bx_1=0$. Next, when the rotation angle of the magnet 110 is $\theta=180°$ (FIGS. 7(a5) and 7(b5)), magnetic fields $Byl_1$ and $Byr_1$ respectively detected by the Hall plate $100hl_1$ and the Hall plate $100hr_1$ have same numerical values. Therefore, $\Delta By_1=0$. Moreover, magnetic fields $Bxl_1$ and $Bxr_1$ respectively detected by the Hall plate $100hlx_1$ and the Hall plate $100hrx_1$ have same numerical values with reverse signs (opposite to the case of $\theta=0°$). Therefore, $\Delta Bx_1$ has a positive maximum value.

Figure 16A:
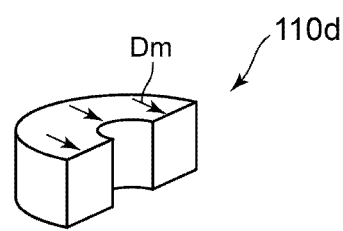
FIGS. 16(a) and 16(b) illustrate perspective views showing modified examples of a shape and a magnetization direction of the magnet.
Figure 16B:
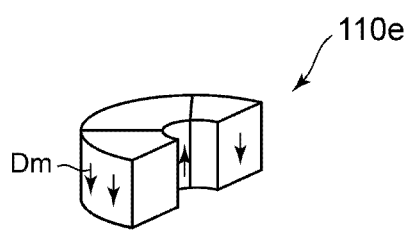
Figure 17A:
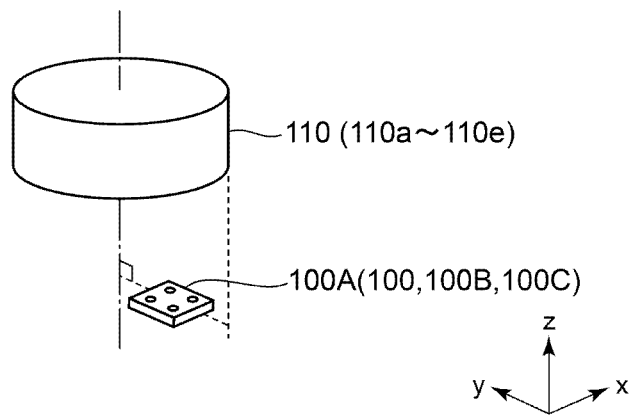
FIGS. 17(a) to 17(c) illustrate perspective views showing modified examples of an arrangement of the Hall IC.
Figure 17B:
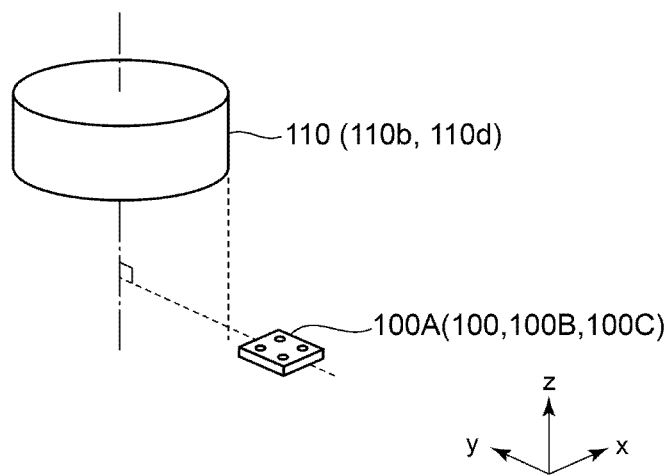
Figure 17C:
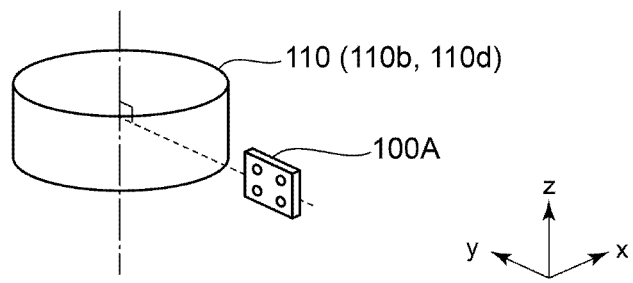

Considering the behaviour of $\Delta By_1$ and $\Delta Bx_1$ above, transition states $\theta=45°$ (FIGS. 7(a2) and 7(b2)), $\theta=135°$ (FIGS. 7(a4) and 7(b4)) and $\theta=180°$ to $360°$, a relationship between rotation angle $\theta$ of the magnet 110 and $\Delta By_1$ and $\Delta Bx_1$ is such that $\Delta By_1$ is proportional to $\sin\theta$ and $\Delta Bx_1$ is proportional to $\cos\theta$, as shown in FIGS. 16(a) and 16(b). Namely, $\Delta By_1/\Delta Bx_1 = k'\cdot\sin\theta/\cos\theta = k'\cdot\tan\theta$, so that $\theta=\arctan(K'\cdot\Delta By_1/\Delta Bx_1)$. Note that k' is a constant for normalizing a magnitude of the amplitude of $\Delta By_1$ and $\Delta Bx_1$ and K' is the reciprocal of k'.

While the Hall IC $100D_1$ has been described above, the same is true for the Hall IC $100D_2$, and since the Hall IC $100_2$ is arranged in the target with respect to the Hall IC $100_1$ and the centre $100c$, $\theta'$ calculated by the signal processing part has a phase shifted by $180°$ with respect to $\theta$, so that $\theta'=\theta-180°$.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A rotation angle detection system comprising:
 a magnet arranged to rotate around a rotation axis, and
 a first magnetic detection circuit defining a first surface provided with
 a first pair of magnetic detection elements arranged to be in combination sensitive to a first magnetic field in circumferential direction to said first surface and to a second magnetic field in normal direction to said first surface and arranged away from said rotation axis, and configured to detect magnetic flux of said magnet, and
 a second pair of magnetic detection elements arranged to be in combination sensitive to said first magnetic field in circumferential direction to said first surface and to said second magnetic field in normal direction to said first surface and
 a signal processing unit configured to output a signal representative of a rotation angle of said magnet based on outputs of said first pair of magnetic detection elements and said second pair of magnetic detection elements, and
 a second magnetic detection circuit provided with
 another first pair of magnetic detection elements arranged to be in combination sensitive to said first magnetic field in circumferential direction to said first surface and to said second magnetic field in normal direction to said first surface and arranged away from said rotation axis, and configured to detect magnetic flux of said magnet, and
 another second pair of magnetic detection elements arranged to be in combination sensitive to said first magnetic field in circumferential direction to said first surface and to said second magnetic field in normal direction to said first surface,
 said second magnetic detection circuit being on a same plane as said first magnetic detection circuit and arranged at a same distance as said first magnetic detection circuit from said rotation axis of said magnet,
 said signal processing unit configured to output a redundant signal corresponding to a rotation angle of said magnet based on outputs of said other first pair of magnetic detection elements and said other second pair of magnetic detection elements.

2. The rotation angle detection system as in claim 1, wherein said signal processing unit is arranged to determine a first magnetic flux density difference in said normal direction and a second magnetic flux density difference in said circumferential direction, from outputs of said first pair of magnetic detection elements and said second pair of magnetic detection elements, and arranged to output a signal representative of said rotation angle of said magnet based on said first magnetic flux density difference and said second magnetic flux density difference.

3. The rotation angle detection system as in claim 2, wherein said signal processing unit is arranged to determine a maximum value of an amplitude of said first magnetic flux density difference and a maximum value of an amplitude of said second magnetic flux density difference based on a rate of change in amplitude of said first and said second magnetic flux density difference, and arranged to normalize said amplitudes of said first and said second magnetic flux density difference in accordance with said maximum values of said amplitude of said first and said second magnetic flux density difference.

4. The rotation angle detection system as in claim 1, wherein said first pair of magnetic detection elements is replaced by a first set of two pairs of magnetic detection elements and said second pair by a second set of two pairs of magnetic detection elements.

5. The rotation angle detection system as in claim 4, wherein said signal processing unit is arranged to determine a third magnetic flux density difference in a radial direction of said rotation and a second magnetic flux density difference in said circumferential direction of said rotation, from outputs of said first set of two pairs of magnetic detection elements and said second set of two pairs of magnetic detection elements, and to output a signal representative of said rotation angle of said magnet based on said third magnetic flux density difference and said second magnetic flux density difference.

6. The rotation angle detection system as in claim 5, wherein said signal processing unit is arranged to determine a maximum value of an amplitude of said third magnetic flux density difference and a maximum value of an amplitude of said second magnetic flux density difference based on a rate of change in amplitude of said third and said second magnetic flux density difference, and to normalize said amplitudes of said third and said second magnetic flux density difference in accordance with said maximum values of the amplitude of said third and said second magnetic flux density difference.

7. The rotation angle detection system as in claim 1, wherein said magnet has a magnetization direction in a direction orthogonal to said rotation axis.

8. The rotation angle detection system as in claim 1, wherein said magnet is divided into two parts by a plane passing through said rotation axis, said two parts being parallel to said rotation axis direction and magnetized in mutually opposite directions.

9. The rotation angle detection system as in claim 1, wherein said magnet is divided into a plurality of parts by a plane passing through said rotation axis in accordance with a rotation angle to be detected, said plurality of parts being parallel to said rotation axis direction and magnetized in mutually opposite directions.

10. The rotation angle detection system as in claim 1, wherein said magnet is formed only at a partial angle around a central axis.

11. The rotation angle detection system as in claim 1, wherein said magnetic detection elements of said first pair are arranged in a region overlapping with said magnet.

12. The rotation angle detection system as in claim 1, wherein said magnetic detection elements of said first pair are arranged in a region not overlapping with said magnet.

13. An attitude control device comprising a rotation angle detection system as in claim 1.

14. An automatic steering device comprising a rotation angle detection system as in claim 1.

15. A throttle device comprising a rotation angle detection system as in claim 1.

* * * * *